United States Patent
Liu et al.

(10) Patent No.: US 11,194,337 B2
(45) Date of Patent: Dec. 7, 2021

(54) CARGO SORTING SYSTEM AND METHOD

(71) Applicant: BEIJING GEEKPLUS TECHNOLOGY CO., LTD., Beijing (CN)

(72) Inventors: Kai Liu, Beijing (CN); Fandi Yu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 22 days.

(21) Appl. No.: 16/755,857

(22) PCT Filed: Apr. 30, 2019

(86) PCT No.: PCT/CN2019/085231
§ 371 (c)(1),
(2) Date: Apr. 13, 2020

(87) PCT Pub. No.: WO2019/218877
PCT Pub. Date: Nov. 21, 2019

(65) Prior Publication Data
US 2021/0200227 A1      Jul. 1, 2021

(30) Foreign Application Priority Data

May 18, 2018 (CN) .......................... 201810480980.8
Nov. 26, 2018 (CN) .......................... 201811419175.0

(51) Int. Cl.
*B07C 3/08* (2006.01)
*G05D 1/02* (2020.01)
(Continued)

(52) U.S. Cl.
CPC ............. *G05D 1/0219* (2013.01); *B07C 3/08* (2013.01); *B07C 3/10* (2013.01); *B07C 3/18* (2013.01);
(Continued)

(58) Field of Classification Search
CPC .. G05D 1/0219; G05D 1/0214; G05D 1/0274; G05D 1/0297; B07C 3/087; B07C 3/10; B07C 3/18; B07C 5/00; B07C 3/02
See application file for complete search history.

(56) References Cited

U.S. PATENT DOCUMENTS

| 1,894,664 A | * | 1/1933 | Butts ........................ | B65D 7/24 294/67.1 |
| 8,785,800 B2 | | 7/2014 | Berdelle-Hilge | |

(Continued)

FOREIGN PATENT DOCUMENTS

| CN | 104142682 A | 11/2014 |
| CN | 104525488 A | 4/2015 |

(Continued)

OTHER PUBLICATIONS

International Search Report for PCT/CN2019/085231 dated Aug. 6, 2019 with English Translation.
(Continued)

*Primary Examiner* — Patrick H MacKey
(74) *Attorney, Agent, or Firm* — Arent Fox LLP

(57) ABSTRACT

Disclosed are a goods sorting system and method. The system includes a control server, a delivery robot, and a first carrying robot. The control server is configured to determine a delivery port according to a road direction of goods to be delivered, allocate the delivery robot, plan a traveling route for the delivery robot, generate a delivery instruction and send the delivery instruction to the delivery robot. The delivery robot is configured to travel to the delivery port, deliver the goods to be delivered to the delivery port. The control server is further configured to: when the number of goods collected in a target goods collection container below the delivery port is greater than or equal to a preset threshold, allocated the first carrying robot, plan a traveling route for the first carrying robot, generate a carrying instruction
(Continued)

and send the carrying instruction to the first carrying robot. The first carrying robot is configured to travel to the target goods collection container according to the traveling route, carry the target goods collection container to a goods collection station. Further disclosed is a server and a storage medium.

15 Claims, 10 Drawing Sheets

(51) Int. Cl.
    *B07C 3/10*     (2006.01)
    *B07C 3/18*     (2006.01)

(52) U.S. Cl.
    CPC ......... *G05D 1/0214* (2013.01); *G05D 1/0274* (2013.01); *G05D 2201/0216* (2013.01)

(56) References Cited

U.S. PATENT DOCUMENTS

| | | | |
|---|---|---|---|
| 9,463,927 B1* | 10/2016 | Theobald | B65G 1/1373 |
| 10,315,231 B1* | 6/2019 | Brazeau | B07C 3/008 |
| 10,800,608 B1* | 10/2020 | Campbell | B65G 1/06 |
| 2012/0143427 A1* | 6/2012 | Hoffman | G06Q 10/08 |
| | | | 701/23 |
| 2013/0134075 A1 | 5/2013 | Berdelle-Hilge | |
| 2015/0347959 A1 | 12/2015 | Skaaksrud | |
| 2016/0101940 A1* | 4/2016 | Grinnell | B65G 1/0492 |
| | | | 700/216 |
| 2017/0029213 A1* | 2/2017 | Johnson | G05D 1/0274 |
| 2017/0174432 A1* | 6/2017 | Zhu | B07C 3/06 |
| 2017/0270466 A1 | 9/2017 | Kao et al. | |
| 2018/0043547 A1 | 2/2018 | Hance et al. | |
| 2019/0105687 A1* | 4/2019 | Bombaugh | B07C 3/14 |
| 2019/0389672 A1* | 12/2019 | Zhang | B07C 3/00 |
| 2020/0086351 A1* | 3/2020 | Miette | B07C 3/02 |
| 2020/0147653 A1* | 5/2020 | Han | B07C 5/00 |
| 2020/0233421 A1* | 7/2020 | Han | G05D 1/0212 |

FOREIGN PATENT DOCUMENTS

| | | |
|---|---|---|
| CN | 106475322 A | 3/2017 |
| CN | 106513328 A | 3/2017 |
| CN | 106975611 A | 7/2017 |
| CN | 107398426 A | 11/2017 |
| CN | 206661696 A | 11/2017 |
| CN | 107878990 A | 4/2018 |
| CN | 107918802 A | 4/2018 |
| CN | 207576955 A | 7/2018 |
| CN | 108401423 A | 8/2018 |
| CN | 108672308 A | 10/2018 |
| CN | 109351643 A | 2/2019 |
| JP | 2016113291 A | 6/2016 |
| JP | 2018507829 A | 3/2018 |
| WO | 2016130856 A1 | 8/2016 |

OTHER PUBLICATIONS

Office action dated Jun. 22, 2021 from corresponding Australian Application No. 2019-268423..

* cited by examiner

CARGO SORTING SYSTEM AND METHOD

This application is a U.S. National Stage Application, filed under 35 U.S.C. 371, of International Patent Application No. PCT/CN2019/085231, filed on Apr. 30, 2019, which claims the priority of a Chinese patent application No. 201810480980.8 filed on May 18, 2018 and the priority of a Chinese patent application No. 201811419175.0 filed on Nov. 26, 2018, the entire contents of all of which are incorporated herein by reference in their entireties.

TECHNICAL FIELD

Embodiments of the present disclosure relate to robot technologies and, for example, relate to a goods sorting system and method.

BACKGROUND

With the rapid development of industrial division and the Internet of Things, a logistics industry is also developing rapidly and is growing gradually, which brings convenience to people's life and improves people's quality of life. The increasingly large logistics volumes bring benefits to logistics centers, but also make goods sorting become a key problem. If little attention is paid, classification errors will be caused, which leads to distribution errors and reduces distribution efficiency. In order to reduce the distribution errors and improve the distribution efficiency, the goods sorting system came into being.

The goods sorting system in the related art includes a cross-belt sorting system and a robot steel platform sorting system. For the cross-belt sorting system, a main drive belt conveyor is connected to a trolley carrying a small belt conveyor. When a "trolley" travels to a specified delivery port, the belt is rotated, the package is delivered into the delivery port, the package slides down along a chute into a goods container located below the delivery port. The goods to be delivered is collected and buffered manually from one or more goods containers. The robot steel platform sorting system includes a control server, a delivery robot, a steel platform and a goods container. The steel platform is erected at a certain height from the ground, and is provided with a plurality of delivery ports. After the control server controls the delivery robot to deliver the goods to be delivered in the delivery ports, the goods slide down along the chute into the goods container located below the delivery port, and the goods to be delivered is collected and buffered manually from one or more goods containers.

After the cross-belt sorting system is manufactured, the number of delivery ports is determined and it is difficult to extend again. For a "chain" serial working mode, once one link have a problem, the whole sorting system cannot work, and a normal production operation is affected. Meanwhile, after sorting through the cross-belt sorting system is finished, the package containers need to be carried manually, so that the efficiency is low, and the labor cost is high. The steel platform in the robot steel platform sorting system is high in construction cost, complex in construction, poor in flexibility of moving and extending, and high in robot density, which causes long waiting time and stopping during the delivery, and thus the efficiency is affected. The package containers are still subjected to second collection and carried to a goods outlet or a truck loading position by lines, which leads to a high labor demand and a high labor cost.

The goods to be delivered are collected and buffered from one or more goods containers in a manual manner, so that when the number of goods to be delivered is very large, not only is the goods sorting efficiency low, but also the goods sorting accuracy is low.

SUMMARY

Embodiments of the present disclosure provide a goods sorting system and method to at least partially improve the goods sorting efficiency, reduce labor costs, improve extending flexibility of the sorting system, and improve the goods sorting accuracy.

In an embodiment, a goods sorting system is provided in the embodiments of the present disclosure and includes: a control server, a plurality of delivery robots and a plurality of first carrying robots, where the control server is communicatively connected to the plurality of delivery robots and the plurality of first carrying robots, respectively.

The control server is configured to determine a delivery port according to a route-and-direction of goods to be delivered, allocate one of the plurality of delivery robots to the goods to be delivered, plan a traveling route for the delivery robot, generate a delivery instruction corresponding to the goods to be delivered, and send the delivery instruction to the delivery robot, where the delivery instruction includes the traveling route of the delivery robot.

The delivery robot is configured to, in response to the delivery instruction, travel to the delivery port according to the traveling route of the delivery robot, and deliver the goods to be delivered to the delivery port.

The control server is further configured to, in a case where the number of collected goods in a target goods collection container below the delivery port is greater than or equal to a preset threshold, allocate one of the plurality of first carrying robot to the target goods collection container, plan a traveling route for the first carrying robot, generate a carrying instruction corresponding to the target goods collection container, and send the carrying instruction to the first carrying robot, where the carrying instruction includes the traveling route of the first carrying robot, the target goods collection container is provided on the ground of the site, one target goods collection container corresponds to at least one route-and-direction, and an opening of the target goods collection container is the delivery port.

The first carrying robot is configured to, in response to the carrying instruction, travel to the target goods collection container according to the traveling route of the first carrying robot, and carry the target goods collection container to a goods collection station.

In an embodiment, a goods sorting method is provided in the embodiments of the present disclosure and includes steps described below.

A control server determines a delivery port according to a route-and-direction of goods to be delivered, allocates a delivery robot to the goods to be delivered, plans a traveling route for the delivery robot, generates a delivery instruction corresponding to the goods to be delivered, and sends the delivery instruction to the delivery robot, where the delivery instruction includes the traveling route of the delivery robot.

In response to the delivery instruction, the delivery robot travels to the delivery port according to the traveling route of the delivery robot, delivers the goods to be delivered to the delivery port, and then returns to a first designated position, where the delivery robot operates on a ground of a site.

In a case where the number of goods collected in a target goods collection container below the delivery port is greater than or equal to a preset threshold, the control server assigns a first carrying robot to the target goods collection container, plans a traveling route for the first carrying robot, generates a carrying instruction corresponding to the target goods collection container, and sends the carrying instruction to the first carrying robot, where the carrying instruction includes the traveling route of the first carrying robot, the target goods collection container is provided on the ground of the site, one target goods collection container corresponds to at least one route-and-direction, and an opening of the target goods collection container is the delivery port.

In response to the carrying instruction, the first carrying robot travels to the target goods collection container according to the traveling route of the first carrying robot, and carries the target goods collection container to a goods collection station, where the first carrying robot operates on the ground of the site.

In an embodiment, a goods sorting method is provided in the embodiments of the present disclosure and includes steps described below.

A control server determines a delivery port according to a route-and-direction of goods to be delivered, allocates a delivery robot to the goods to be delivered, plans a traveling route for the delivery robot, generates a delivery instruction corresponding to the goods to be delivered, and sends the delivery instruction to the delivery robot, where the delivery instruction includes the traveling route of the delivery robot.

In a case where the number of goods collected in a target goods collection container below the delivery port is greater than or equal to a preset threshold, the control server assigns allocates a first carrying robot to the target goods collection container, plans a traveling route for the first carrying robot, generates a carrying instruction corresponding to the target goods collection container, and sends the carrying instruction to the first carrying robot, where the carrying instruction includes the traveling route of the first carrying robot.

The delivery robot and the first carrying robot both operate on a ground of a site, the target goods collection container is provided on the ground of the site, one target goods collection container corresponds to at least one route-and-direction, and an opening of the target goods collection container is the delivery port.

In an embodiment, a server is provided in the embodiments of the present disclosure and includes: one or more processors and a memory.

The memory is configured to store one or more programs.

When the one or more programs are executed by the one or more processors, the one or more processors implement the method executed on a server side described above.

In an embodiment, a computer-readable storage medium is provided in the embodiments of the present disclosure. The computer-readable storage medium stores computer programs. The computer programs, when executed by a processor, implement the method executed on the server side described above.

DETAILED DESCRIPTION

Figure 1:
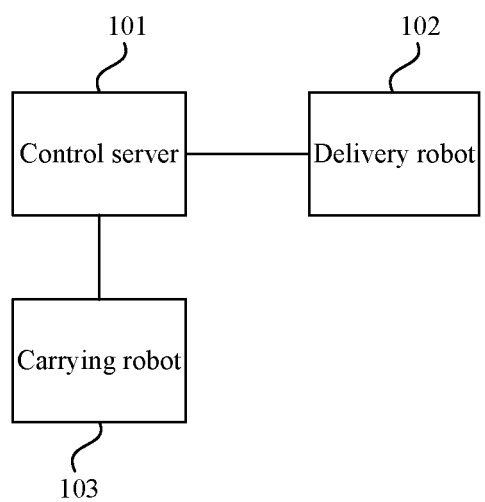
FIG. 1 is a structural diagram of a goods sorting system according to Embodiment one of the present disclosure.

The present disclosure will be described below in conjunction with the drawings and embodiments. The embodiments set forth below are intended to explain and not to limit the present disclosure. For ease of description, only part, not all, of structures related to the present disclosure are illustrated in the drawings.

Embodiment One

FIG. 1 is a structural diagram of a goods sorting system according to Embodiment one of the present disclosure. The embodiment may be applicable to the case of goods sorting. The goods sorting system includes a control server 101, a plurality of delivery robots 102 and a plurality of carrying robots 103. The plurality of delivery robots 102 and the plurality of carrying robots 103 all operate on a ground of a site, the target goods collection container is provided on the ground of the site, one target goods collection container corresponds to at least one route-and-direction, and an opening of the target goods collection container is the delivery port.

In the embodiment, the control server 101 establishes a communication connection with the plurality of delivery robots 102 and the plurality of carrying robots 103, and is configured to implement control and scheduling of the entire goods sorting system. In an embodiment, the control server 101 is a software system having data storage and information processing capabilities, and may be connected to the delivery robots 102, the carrying robot and other hardware input systems or software systems in the system in a wired or wireless manner. The control server 101 may issue tasks to the delivery robots 102 and the carrying robot 103, transmit information to workers, count a situation of goods to be delivered in a target goods collection container, and issue control commands to the delivery robots 102 and the carrying robot 103, and the like.

The control server 101 is configured to determine a target goods collection container corresponding to a route-and-direction in route direction information according to the route direction information about the goods to be delivered, allocate the delivery robot 102 to the goods to be delivered, plan a delivery route for the delivery robot 102 according to a position of the target goods collection container, generate a delivery instruction corresponding to the goods to be delivered, and send the delivery instruction to the delivery robot 102, where the delivery instruction includes the delivery route of the delivery robot 102.

In the embodiment, the route direction information about the goods to be delivered refers to the city in the receiving address of the goods to be delivered. Route-and-direction may be understood as the receiving address of the goods to be delivered. In an embodiment, the goods to be delivered are classified and sorted according to the route direction information of the goods to be delivered. The route direction information of the goods to be delivered includes the target goods collection container corresponding to the route-and-direction. The control server 101 pre-stores a correspondence between the route-and-direction and the target goods collection container. After the control server 101 acquires the route direction information about the goods to be delivered, a query is made in a database of the control server 101 according to the route direction of the goods to be delivered, and the target goods collection container corresponding to the route direction of the goods to be delivered is determined. In an embodiment, the number of delivery robots 102 allocated by the control server 101 to the goods to be delivered is one or more, and the number of delivery robots 102 allocated by the control server 101 to the goods to be delivered is related to the number of goods to be delivered. In an embodiment, one delivery robot 102 delivers one piece of goods to be delivered. In another embodiment, one delivery robot 102 delivers two pieces of goods to be delivered.

In the embodiment, the route direction information is obtained by a code scanning device of a goods supply platform through scanning a quick response (QR) code or a barcode of the goods, and is sent to the control server 101. In an embodiment, the goods is delivered to the worker through a chute of a transmission line, and the worker places the goods on the delivery robot 102 after the worker acquires the goods. The delivery robot 102 moves in an arc trace in a region close to the goods supply platform. Therefore, the worker may place the goods in the delivery robot 102 located at a left side, a right side or a front side of the goods supply platform. After entering the goods supply platform, the delivery robot slows down or stops for a preset period of time and then continues to travel. In this way, it is convenient for the worker to place the goods on the delivery robot while route blockage is avoided. A delivery robot 102 carrying the goods continues moving, passes by the scanning device of the goods supply platform, and acquires the route direction information about the goods by scanning the QR code or the barcode of the goods with the scanning device. In an embodiment, when the scanning device does not acquire the route direction information of the goods, the delivery robot 102 delivers the goods to an abnormality target goods collection container and then returns to the goods supply platform to queue.

The delivery robot 102 is configured to, in response to the delivery instruction, move to the target goods collection container according to a delivery route, and deliver the goods to be delivered to the target goods collection container through a delivery mechanism.

In the embodiment, the target goods collection container may be a common container for storing goods to be delivered, such as a common cage trolley, or the like. The target goods collection container is typically configured to carry items with common properties. Exemplarily, the target goods collection container may be to carry goods to be delivered to Haidian District, Beijing.

In an embodiment, after the delivery robot 102 delivers the goods to be delivered to the target goods collection container, the delivery robot 102 returns to the goods supply platform to proceeds to perform a next delivery task.

The control server 101 is further configured to: when the goods collected in the target goods collection container meet a collection condition, lock the target goods collection container, allocate a carrying robot 103 to the target goods collection container, plan a carrying route for the carrying robot 103 according to a position of the target goods collection container, generate a carrying instruction corresponding to the target goods collection container, and send the carrying instruction to the carrying robot 103, where the carrying instruction includes the carrying route of the carrying robot 103.

In the embodiment, the collection condition is that the target collection container is full and cannot carry more goods. The embodiment provides three implementation modes of acquiring whether the goods collected in the target collection container meet the collection condition. In one implementation mode, the delivery robot 102 sends information that the target goods collection container is full to the control server 101.

In another implementation mode, the control server 101 estimates a volume of goods in the target goods collection container according to the volume of each goods and the number of the goods in the target goods collection container, and compares the volume of the goods in the target goods container with a capacity of the target goods collection container. If the volume of the goods in the target goods collection container is larger than the capacity of the target goods collection container, the goods collected in the target goods collection container meet the collection condition.

In another implementation mode, an infrared sensor and a wireless module are mounted on an upper edge of the target goods collection container. When the infrared sensor detects that the target goods collection container is full, information that the target goods collection container is full is sent to the control server 101 through the wireless module.

In an embodiment, the number of carrying robot 103 allocated by the control server 101 is one or more. The number of carrying robot 103 allocated by the control server 101 is related to the number of target goods collection container to be moved. In an embodiment, one carrying robot 103 carries one target goods collection container.

After the control server 101 receives the information that the target goods collection container is full, the control server 101 locks the target goods collection container, and the delivery robot 102 is prohibited from delivering the goods to the target goods collection container. The control server 101 allocates a carrying robot 103 to the target goods collection container, acquires position information about the target goods collection container, plans the carrying route for the carrying robot 103 according to the position of the target goods collection container, generates the carrying instruction corresponding to the target goods collection container, and sends the carrying instruction to the carrying robot 103, where the carrying instruction includes the carrying route of the carrying robot 103.

The carrying robot 103 is configured to, in response to the carrying instruction, move to the target goods collection container according to the traveling rote of the carrying robot, and move the target goods collection container to a goods collection station.

In the embodiment, the carrying robot 103 may have an intelligent system, which can communicate with the control server 101 and receive the carrying instruction sent by the control server 101. In an embodiment, the carrying instruction includes at least the position of the target goods collection container and route navigation information. In response to carrying instructions corresponding to one or more target goods collection containers, the carrying robot 103 carries the goods to be delivered in the target goods collection container from the position of the target goods collection container to a goods collection station corresponding to the target goods collection container according to the route navigation information.

In the embodiment, after the carrying robot 103 carries the target goods collection container filled with goods, in order to avoid the goods to be delivered from falling on the ground, the control server 101 simultaneously allocates another carrying robot to carries one empty goods collection container to the corresponding target goods collection container. The control server 101 allocates one carrying robot to the empty goods collection container, plans a traveling rote for the carrying robot according to the current position of the empty goods collection container and the original position of the target goods collection container, generates a carrying instruction corresponding to the empty goods collection container, and sends the carrying instruction to another carrying robot, where the carrying instruction includes the traveling rote of the another carrying robot.

In an embodiment, the route planned by the control server 101 for the robot is a ring-shaped route. The robot described above includes the delivery robot 102 and the carrying robot 103, that is, the traveling rote of the delivery robot 102 is a ring-shaped route, and the traveling rote of the carrying robot 103 is also a ring-ship route. In an embodiment, a turn of the ring-shaped route is arc-shaped.

In the embodiment, the ring-shaped delivery route of the delivery robot 102 and the ring-shaped carrying route of the carrying robot 103 are each comprised of a straight route and an arch-shaped route. The arc-shaped route means that the robot travels in an arc-shaped route during turning, so that the robot does not stop during turning, and the operation time of the robot is saved.

In an embodiment, the control server 101 is configured to, when the delivery robot 102 and/or the carrying robot 103 move in the straight route, control the delivery robot 102 and/or the carrying robot 103 to move in the straight line by using inertial navigation as a main manner and visual navigation as an auxiliary manner. The control server 101 is configured to, when the delivery robot 102 and/or the carrying robot 103 move in the arc-shaped route, control the delivery robot 102 and/or the carrying robot 103 to move in the arc-shaped line in a two-wheel differential drive manner.

In the embodiment, when the robot moves in the straight line, the robot uses a two modes combined positioning manner, and the control server 101 controls the robot to move in the straight line by using the inertial navigation as the main manner and the visual navigation as the auxiliary manner. A working region is provided with positioning landmarks at intervals. Over the distance between landmarks, the robot uses the inertial navigation positioning, accurately determines the position by using the positioning landmark, and corrects an error caused by the inertial navigation positioning, such that the robot can move in the straight line. The robot includes the delivery robot 102 and the carrying robot 103.

In the embodiment, when the robot moves in the arc-shaped route, the control server 101 controls the delivery robot 102 and/or the carrying robot 103 to move in the arc-shaped line in the two-wheel differential drive manner. The robot uses the two-wheel differential drive manner, that is, the left wheel and the right wheel of the robot use two drive motors. The moving direction of the robot is changed by means of the differential driving of the left motor and the right motor, and the differential speed of the left motor and the right motor of the robot may be calculated by the control server 101 according to a size of the working region, a volume of the robot, and a steering radius of the robot.

A goods sorting system is provided in the embodiments of the present disclosure and includes a control server, a delivery robot and a goods collection container cluster. The goods collection container cluster includes a plurality of goods collection container groups, and the plurality of collection container groups are distributed in an array in the site. Transverse channels and longitudinal channels formed by array gaps are moving channels of the robot. The delivery robot includes a robot body and a delivery mechanism provided on the robot body. Firstly, a target goods collection container corresponding to a route-and-direction in route direction information of a goods to be delivered is determined according to road information of the goods to be delivered. A delivery robot is allocated to the goods to be delivered, and a delivery route is planned for the delivery robot according to the position of the target goods collection container. A delivery instruction corresponding to the goods to be delivered is generated and the delivery instruction is sent to the delivery robot. Then, the delivery robot moves to the target goods collection container according to the delivery route, and delivers the goods to be delivered to the target goods collection container through the delivery mechanism. Technical solutions provided in the embodiments of the present disclosure can improve the goods sorting efficiency, reduce labor costs and simultaneously improve extending flexibility of the sorting system.

Embodiment Two

Figure 2A:
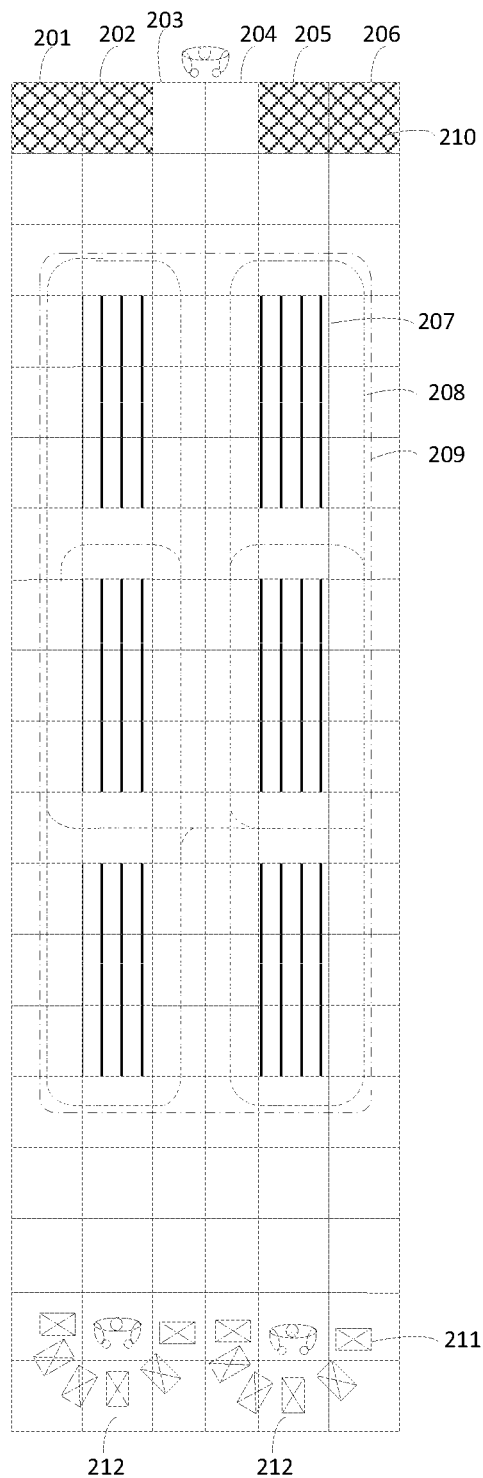
FIG. 2A is a layout diagram of a sorting system according to Embodiment two of the present disclosure.

In the embodiment, a goods sorting system is optimized on the basis of the above embodiment. FIG. 2A is a layout diagram of a sorting system according to Embodiment two of the present disclosure.

In the embodiment, the goods sorting system further includes a goods collection container cluster, the goods collection container cluster includes a plurality of goods collection container groups, one goods collection container group includes at least one target goods collection container, and the plurality of goods collection container groups are distributed in a site in an array. Transverse channels (or intervals) and longitudinal channels formed by array gaps are moving channels of the robot, one target goods collection container corresponds to at least one route-and-direction, and an opening the target goods collection container is a delivery port for a goods to be delivered.

As shown in FIG. 2A, a robot moves in at least one group of working regions, each group of working regions includes a first column of sub-regions 201, a second column of sub-regions 202, a third column of sub-regions 203, a fourth column of sub-regions 204, a fifth column of sub-regions 205, and a sixth column of sub-regions 206 which are arranged in sequence. A width of each of the first column of sub-regions 201, the second column of sub-regions 202, the fifth column of sub-regions 205 and the sixth column of sub-regions 206 is greater than a width of the third column of sub-regions 203 and is greater than a width of the fourth column of sub-regions 204. The second column of sub-regions 202 and the fifth column of sub-regions 205 are arranged to place the target goods collection container.

In an embodiment, a working region layout of a sorting system includes a goods supply platform, a goods collection station, a goods collection container cluster and routes planned by the control server. A sorting system provided in the embodiment of the present disclosure includes two goods supply platforms 212, the goods collection station 210 and six goods collection container groups. Each goods collection container group includes three target goods collection containers 207. In an embodiment, the number of target goods collection containers in each goods collection container group may be flexibly set with a minimum of 1. FIG. 2A merely shows a sorting system including two goods supply platforms 212, one goods collection station 210 and six goods collection container groups. In practical applications, the number of goods supply platforms, the number of goods collection stations, the number of goods collection container groups and the number of target goods collection containers in each goods collection container group are designed as required. The whole working region may also be provided with multiple sorting systems according to the actual situation.

In an embodiment, every two goods collection container groups are a pair, and a width of a channel between any two pairs of goods collection container groups is greater than a width of a channel between the two goods collection container groups within any pair of goods collection container groups.

In an embodiment, the channel between any two pairs of goods collection container groups is the moving channel of the carrying robot.

In an embodiment, cells of the second column of sub-regions 202 and the fifth column of sub-regions 205 for placing the target containers 207 may be set according to a size of the target goods collection container. Exemplarily, the size of the target goods collection container is 900 mm×900 mm, and then the size of the cell in the second column of sub-regions 202 and the fifth column of sub-regions 205 may be set to 1 m×1 m. In this way, a safety margin of 100 mm is provided between two columns of target goods collection containers 207. The safety margin between two pairs of goods collection container groups may be flexibly set according to the operation accuracy of the robot.

The control server is configured to plan a ring-shaped delivery route 208 for a delivery robot 211 in the first column of sub-regions 201 and the third column of sub-regions 203 or the fourth column of sub-regions 204 and the sixth column of sub-regions. The control server is further configured to plan a ring-shaped carrying route 209 for a carrying robot (not shown in the figure) in the first column of sub-regions 201 and the sixth column of sub-regions 206.

In an embodiment, as shown in FIG. 2A, the delivery route 208 and the carrying route 209 are ring-shaped channels formed by the horizontal channels and the longitudinal channels around the target goods collection container, and the ring-shaped delivery route 208 of the delivery robot and the ring-shaped carrying route 209 of the carrying robot are each formed by a straight route and an arc-shaped route. The arc-shaped route means that the robot travels in an arc-shaped route during turning, so that the robot does not stop during turning, and the operation time of the robot is saved. The delivery robot and the carrying robot pass by center positions of the cells in the straight route of the ring-shaped delivery route 208 and in the straight route of the ring-shaped carrying route 209, respectively.

In an embodiment, the channel between two goods collection container groups within any pair of goods collection container group is the carrying channel of the carrying robot.

In the embodiment, the third column of sub-regions 203 and the fourth column of sub-regions 204 between two goods collection container groups within one pair of goods collection container groups are merely the traveling rote of the delivery robot, and is not the traveling rote of the carrying robot. Thus, the width of the third column of sub-regions 203 and the width of the fourth column of sub-regions 204 are set to be less than the width of the first column of sub-regions 201, the width of the second column of sub-regions 202, the width of the fifth column of sub-regions 205 and the width of the sixth column of sub-regions 206. In this way, more target goods collection containers may be set in a smaller working region, and the same number of target goods collection containers may be achieved in a smaller site, and space is saved. In an embodiment, the delivery route and the carrying route have the same direction, that is, the delivery route and the carrying route are both clockwise or both counterclockwise. In an embodiment, in the first column of sub-regions 201 and the sixth column of sub-regions 206, the delivery route 208 and the carrying route 209 coincide, that is, the delivery robot and the carrying robot use a same traveling rote.

Figure 2B:
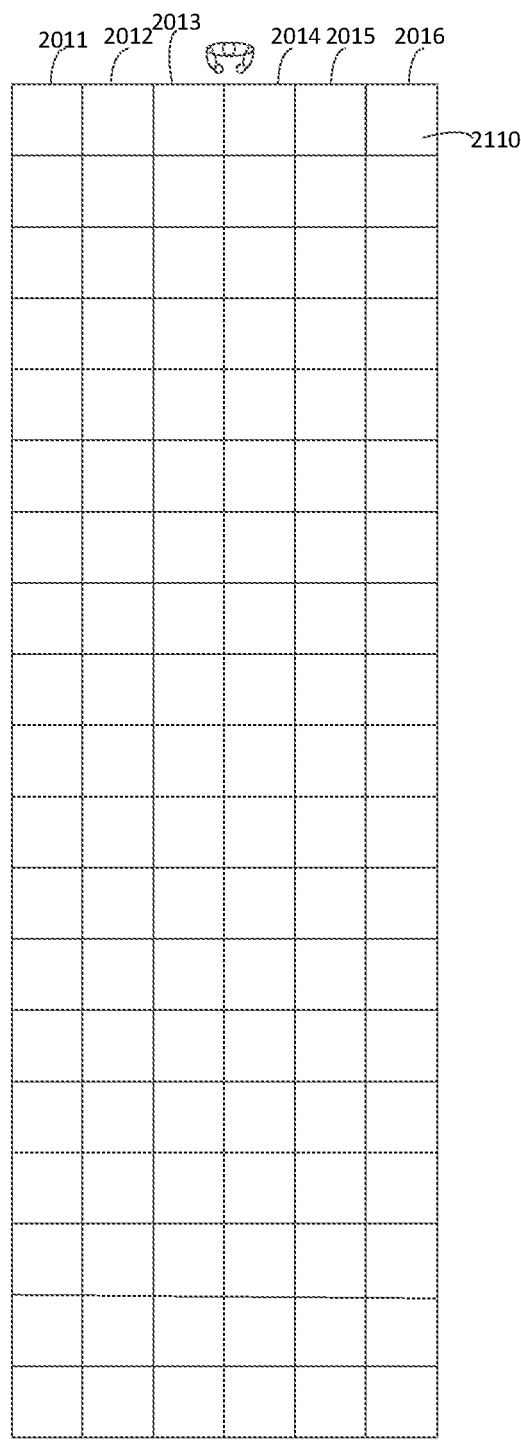
FIG. 2B is a layout diagram of a sorting system according to Embodiment two of the present disclosure.

Another layout solution of a sorting system is provided in the embodiment, and FIG. 2B is a layout diagram of a sorting system according to Embodiment two of the present disclosure. As shown in FIG. 2B, each group of working regions includes a first column of sub-regions 2011, a second column of sub-regions 2012, a third column of sub-regions 2013, a fourth column of sub-regions 2014, a fifth column of sub-regions 2015, and a sixth column of sub-regions 2016 which are arranged in sequence. In the embodiment, all sub-regions have the same width, and advantages of this arrangement is that a goods collection station 2110 in the third column of sub-regions 2013 and a goods collection station 2110 in the fourth column of sub-regions 2014 close to workers may also be used for placing the target goods collection container for receiving goods. In an embodiment, the layout of the sorting system in FIG. 2B merely differs that in FIG. 2A in that the width of the third column of sub-regions 2013 and the width of the fourth column of sub-regions 2014 are different from the width of the third column of sub-regions 203 and the width of the fourth column of sub-regions 204. The layout scheme of other regions in FIG. 2B, for example, the first column of sub-regions 2011, the second column of sub-regions 2012, the fifth column of sub-regions 2015, the sixth column of sub-regions 2016, a position of a goods supply platform, a working region of the workers, a delivery route and a carrying route, and the like is the same as the layout scheme in FIG. 2A. The layout scheme same as that in FIG. 2A is not shown in FIG. 2B.

In the embodiment, the landmark in the traveling rote of the carrying robot is located at the center position of the cell, and the landmark in the traveling rote of the delivery robot is located at a position, close to the delivery port, of the cell.

As shown in FIG. 2A, in an embodiment, each cell is provided with a landmark for positioning, landmarks of the first column of sub-regions 201 and landmarks of the sixth column of sub-regions 206 are located at center positions of corresponding cells, and landmarks of the third column of sub-regions 203 and landmarks of the fourth column of sub-regions 204 are located at the positions, close to the delivery ports, of the cells. In this way, the delivery robot can be close to the target goods collection container, so as to avoid a package from falling on the ground and improve the delivery safety. In an embodiment, in order to increase delivery reliability, the landmark may also be set at the center position of each cell, the cage trolley is provided with a mechanism chute, or the cage trolley may be placed at a position closer to the delivery route, or the delivery mechanism may be designed to be an everted structure, so that the package may be accurately delivered to the cage trolley. The embodiment of the present disclosure also provides an implementation mode to increase a delivery speed of the delivery mechanism to ensure that the package can be delivered accurately by crossing the gap between the delivery mechanism and the cage trolley.

Another implementation mode is provided in the embodiment. Landmarks of the third column of sub-regions 203 and the fourth column of sub-regions 204 are set at center positions of corresponding cells, and a target goods collection container is placed at a position close to the third column of sub-regions 203 and the fourth column of sub-regions 204.

In the embodiment, as shown in FIG. 2A, a goods supply platform 212 is provided with a working position for supply workers, where the goods supply platform 212 is provided on one side of a site and the goods collection station 210 is provided on an opposite side of the goods supply platform 212. In an embodiment, a goods supply worker may stand directly on the ground, below the ground, or above the ground by a manner of elevation. A cage trolley placement region for carrying unsorted goods is in front of the goods supply platform, and each goods supply platform is provided with at least two cells of cage trolley placement regions close to the goods supply platform. In the embodiment, a traveling rote close to the goods supply platform 212, of the delivery robot 102 is not limited. In an embodiment, the delivery robot 102 moves in an arc-shaped line in a region close to the goods supply platform.

In the embodiment, a working position for a pick-up worker is set at the goods collection station. After reaching the goods collection station, the carrying robot is arranged in a line, so that the pick-up worker can take away a target goods collection container conveniently and place an empty goods collection container on the carrying robot. The empty goods collection container is bound to route direction information through a scanning apparatus of the goods collection station, a ring-shaped route of the carrying robot is planned, and the empty goods collection container is carried to a corresponding target container. In an embodiment, in order to improve the service efficiency of the target goods collection container, a region for an empty goods collection container and a region for a full goods collection container are set at the goods collection station.

In the embodiment, in order to avoid the target goods collection container deviating from the standard position in a process in which the pick-up worker takes away the full target goods collection container or places the empty goods collection container, a corresponding fixing apparatus is usually used. In an embodiment, the fixing apparatus may be provided on the carrying robot, and the target goods collection container is fixed. Alternatively, the fixing apparatus is provided in the cell where the goods collection station is located, and the target goods collection container is fixed.

In the embodiment, when the total number of target goods collection containers is greater than the total number of route-and-directions, any one of the route-and-directions is bound to at least one of the target goods collection containers, respectively. In a case where one of the route-and-directions is bound to at least two of the target goods collection containers, the at least two of the target goods collection containers belong to different goods collection container groups.

In an embodiment, when the total number of target goods collection containers is greater than the total number of route-and-directions, any one route-and-direction of the goods to be delivered is bound to at least one target goods collection container belonging to different delivery groups, respectively. When the number of target goods collection containers in a working region is greater than the number of route-and-directions of the goods to be delivered, a plurality of target goods collection containers may be set by the control server to correspond to the same route direction information, and the plurality of target goods collection containers are distributed in different delivery loops, so that the movement of the delivery robot in the loop can be reduced. In addition, after one target goods collection container is full and is locked, the delivery robot may deliver the goods to the target goods collection container of the same route information.

In an embodiment, since the delivery robot travels more frequently than the carrying robot, the server may set a route-and-direction with more goods as a high active route-and-direction, and arrange the high active route-and-direction at the delivery port closer to the goods supply platform, so that a moving distance of the delivery robot can be shortened, and thus delivery time can be shortened.

In the embodiment of the present disclosure, the width of the third column of sub-regions and the width of the fourth column of sub-regions are set to be less than the width of the first column of sub-regions, the width of the second column of sub-regions, the width of the fifth column of sub-regions and the width of the sixth column of sub-regions. In this way, more target goods collection containers may be set in the smaller working region, and the same number of target goods collection containers may be achieved in the smaller site, and the space is saved. When the total number of target goods collection containers in the working region is greater than the total number of route directions of the goods to be delivered, the plurality of target goods collection containers may be set by the control server to correspond to a same route direction, and a plurality of delivery ports are distributed in different delivery loops, so that movement of the delivery robot in the loop can be reduced.

Embodiment Three

Figure 3:
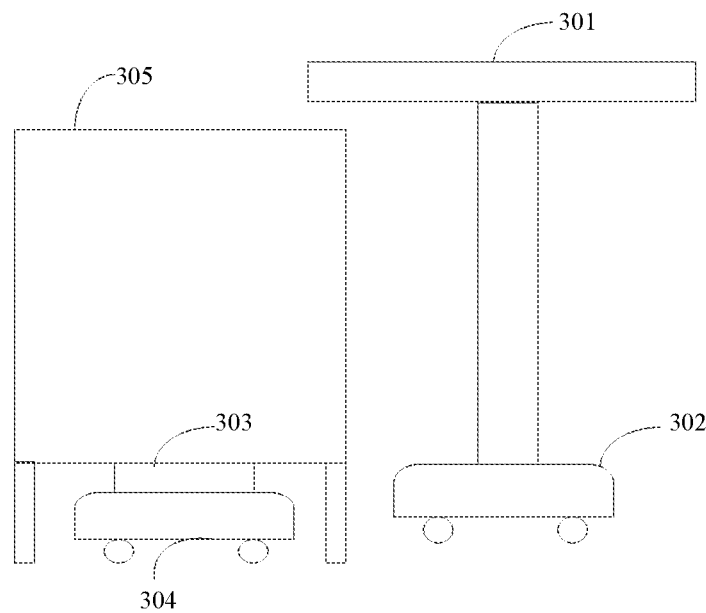
FIG. 3 is a structural diagram of a delivery robot and a carrying robot according to Embodiment three of the present disclosure.

In the embodiment, a goods sorting system is optimized on the basis of the above embodiment. FIG. 3 is a structural diagram of a delivery robot and a carrying robot according to Embodiment three of the present disclosure.

As shown in FIG. 3, a delivery robot includes a delivery robot body 302 and a delivery mechanism 301 provided on the delivery robot body. A carrying robot includes a jacking apparatus 303 and a carrying robot body 304. In an embodiment, the delivery robot is provided with the delivery mechanism 301, and a height of an upper surface of the delivery mechanism 301 from the ground is greater than or equal to a height of an upper surface of a target goods collection container 305 from the ground. The carrying robot is provided with the jacking apparatus 303, and a height of an upper surface of the jacking apparatus 303 of the carrying robot is less than a height of a lower surface of the target goods collection container from the ground. In an embodiment, the delivery mechanism 301 delivers goods by means of a belt, a turnover plate or in a pushing manner. The delivery device delivers the goods to be delivered in a belt conveying manner, a turnover plate delivery manner or a pushing manner. The one of the plurality of delivery robots is configured to, in response to the delivery instruction, travel to the target goods collection container according to a delivery route, and deliver, in a traveling process, the goods to be delivered to the target goods collection container through the delivery device.

In an embodiment, when the delivery robot moves in an arc-shaped route, the delivery mechanism 301 and the delivery robot body 302 rotate at a same speed in a same direction, and when the carrying robot moves in the arc-shaped route, the jacking apparatus 303 and the carrying robot body 304 rotate relative to each other. When the delivery robot moves in the arc-shaped route, the delivery mechanism 301 and the delivery robot body 302 rotate together without relative rotation. When the carrying robot moves in the arc-shaped route, the jacking apparatus 303 and the carrying robot body 304 rotate relative to each other, and the target goods collection container is kept not rotating relative to the ground.

In the embodiment, a sensor is mounted on the delivery robot, a sensor detection head is pointed to an upper edge of the target goods collection container and is configured to detect whether the target goods collection container is filled with goods. When the target goods collection container is filled with goods, a message that the target collection container is full is sent to the control server. For example, the sensor may be an infrared detection head. If the goods exceed the target goods collection container (that is, the target goods collection container has been filled with goods), an infrared ray will hit the goods and a signal feedback is received, and the robot will know that the target goods collection container is full. If no signal feedback is received, it indicates that the target goods collection container is not full. In addition, the server may also estimate whether the target goods collection container is full according to a size of each piece of delivered goods and the capacity of the target goods collection container. In order to improve detection accuracy, the detection may also be performed in the present application in combination with the two manners described above.

In an implementation mode, the sensor is mounted on a lower edge of the delivery mechanism 301. When the delivery robot passes by one or more cage trolleys, whether a package exceeds an upper edge of the cage trolley may be detected. When the sensor detects that a package exceeds the upper edge of the cage trolley, it is considered that a volume of the packages collected by the cage trolley reaches the maximum capacity of the target goods collection container, and the cage trolley is full.

When the control server receives information that the target goods collection container is full, the control server locks the target goods collection container, that is, the delivery robot no longer delivers goods to the target goods collection container. The control server searches for a target goods collection container with the same route direction information, and re-plans a delivery route, so that the delivery robot delivers the goods to the delivery port with a same route-and-direction. If no delivery port with the same route-and-direction is found, the delivery robot is controlled to continuously move in a ring-shaped route in a working region. When the carrying robot carries an empty goods collection container to an original target goods collection container, the control server unlocks the target goods collection container, and the delivery robot moves to the delivery port to perform a delivery task.

Figure 4:
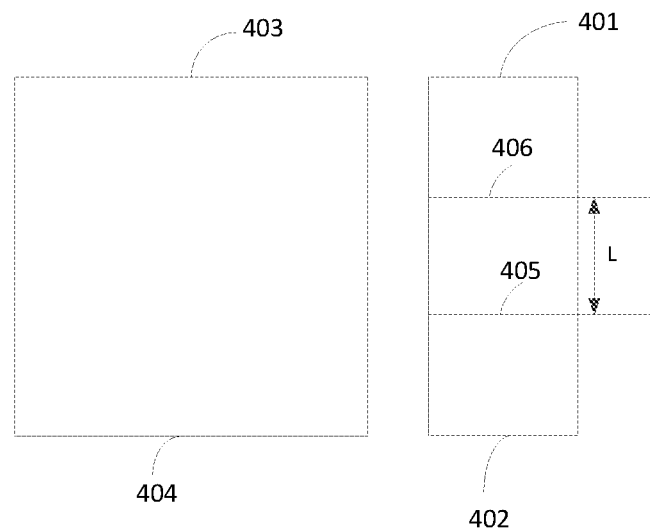
FIG. 4 is a schematic diagram showing a delivery robot moving to deliver goods according to Embodiment three of the present disclosure.

The delivery robot is configured to, in response to the delivery instruction, move to the target goods collection container according to the delivery route, and deliver the goods to be delivered to the target goods collection container through the delivery mechanism in a traveling process. FIG. 4 is a schematic diagram showing a delivery robot moves and delivers goods according to Embodiment three of the present disclosure. As shown in FIG. 4, when a first boundary 401 of the delivery robot coincides with a first boundary 403 of the delivery port, the delivery robot keeps moving and starts to perform a delivery action to deliver the goods to be delivered to a target goods collection container corresponding to the delivery port. When a second boundary 402 of the delivery robot coincides with a second boundary of the delivery port 404, the delivery robot keeps moving and the delivery action is terminated. In an embodiment, a boundary 405 refers to a position of the second boundary of the delivery robot when the first boundary 401 of the delivery robot coincides with the first boundary 403 of the delivery port; a boundary 406 refers to a position of the first boundary of the delivery robot when the second boundary 402 of the delivery robot coincides with the second boundary of the delivery port 404. A safe range of delivery by the robot is L. When a moving speed of the delivery robot is V, the delivery action of the delivery mechanism needs be completed within a period of time T, where T=L/V. When the delivery action of the delivery mechanism is not completed within the period of time T, the delivery action is stopped, and a package to be delivered is delivered to an abnormality delivery port. Alternatively, the robot moves for another loop, and delivers the package to be delivered again.

In the embodiment, the delivery robot is provided with a delivery mechanism, and the height of the upper surface of the delivery mechanism from the ground is greater than or equal to the height of the upper surface of the target goods collection container from the ground, so that the delivery mechanism can deliver the goods to the target goods collection container and the goods is not easy to drop. The delivery robot continuously moves to the delivery port according to the ring-shaped delivery route, and delivers the goods to be delivered to the delivery port when the delivery robot moves within the delivery range of the delivery port and then returns. The delivery robot continuously moves in the delivery process, so that delivery time of the robot can be reduced and the working efficiency can be improved.

Embodiment Four

Figure 5:
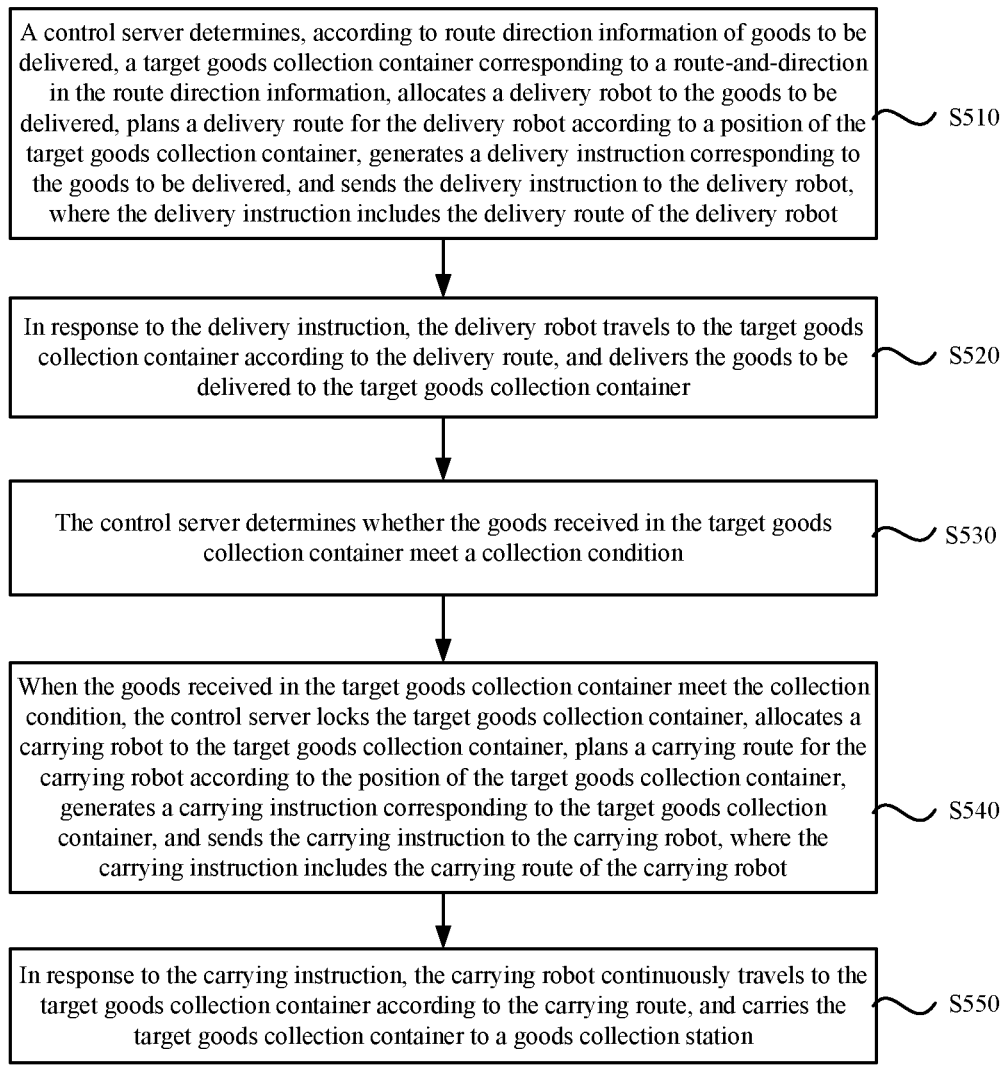
FIG. 5 is a flowchart of a goods sorting method according to Embodiment four of the present disclosure.

FIG. 5 is a flowchart of a goods sorting method according to Embodiment four of the present disclosure, and the embodiment may be applicable to the case of goods sorting. The method is performed by a goods sorting system, and as shown in FIG. 5, the goods sorting method includes steps S510 to S540.

In step S510, a control server determines, according to route direction information of a goods to be delivered, a target goods collection container corresponding to a route-and-direction in the route direction information, allocates a delivery robot to the goods to be delivered, plans a delivery route for the delivery robot according to a position of the target goods collection container, generates a delivery instruction corresponding to the goods to be delivered, and sends the delivery instruction to the delivery robot, where the delivery instruction includes the delivery route of the delivery robot.

In step S520, in response to the delivery instruction, the delivery robot moves to the target goods collection container according to the delivery route of the delivery robot, and delivers the goods to be delivered to the target goods collection container.

The target goods collection container is any one goods collection container of a goods collection container cluster.

The goods collection container cluster includes a plurality of goods collection container groups, each goods collection container group includes at least one target goods collection container, and the plurality of goods collection container groups are distributed in an array in a site. Transverse channels and longitudinal channels formed by array gaps are moving channels for a robot. One target goods collection container corresponds to at least one route direction, and an opening the target goods collection container is a delivery port of the goods.

In step S530, the control server determines whether the goods collected in the target goods collection container meet a collection condition.

In step S540, when the goods collected in the target goods collection container meet the collection condition, the control server locks the target goods collection container, allocates a carrying robot to the target goods collection container, plans a carrying route for the carrying robot according to the position of the target goods collection container, generates a carrying instruction corresponding to the target goods collection container, and sends the carrying instruction to the carrying robot, where the carrying instruction includes the carrying route of the carrying robot.

In step S550, in response to the carrying instruction, the carrying robot continuously moves to the target goods collection container according to the carrying route of the carrying robot, and carries the target goods collection container to a goods collection station.

In an embodiment, the route planned by the control server for the robot is a ring-shaped route.

In an embodiment, a turn of the ring-shaped route is arc-shaped. In an embodiment, the step in which in response to the delivery instruction, the delivery robot moves to the target goods collection container according to the delivery route and delivers the goods to be delivered to the target goods collection container through a delivery mechanism includes a step described below.

In response to the delivery instruction, the delivery robot moves to the target goods collection container according to the delivery route of the delivery robot, and delivers the goods to be delivered to the target goods collection container through the delivery mechanism during moving.

In an embodiment, when the total number of target goods collection containers is greater than the total number of route-and-directions, any route-and-direction is bound to at least one target goods collection container. In a case where one route-and-direction is bound to at least two target goods collection containers, the at least two target goods collection containers belong to different goods collection container groups, respectively.

In an embodiment, the step in which the control server determines whether the goods collected in the target goods collection container meet the collection condition includes a step described below.

The delivery robot detects whether the target goods collection container is filled with goods through a sensor. When the target goods collection container is filled with goods, a message that the target collection container is full is sent to the control server. Alternatively, the control server estimates whether the target goods collection container is filled with goods according to a capacity of the target goods collection container and a size of the goods to be delivered.

A goods sorting method is provided in the embodiments of the present disclosure. Firstly, the target goods collection container corresponding to the route-and-direction in the route direction information is determined according to the route direction information of the goods to be delivered, the delivery robot is allocated to the goods to be delivered, the delivery route is planned for the delivery robot according to the position of the target goods collection container, the delivery instruction corresponding to the goods to be delivered is generated and sent to the delivery robot. Secondly, the delivery robot moves to the target goods collection container according to the delivery route, and the goods to be delivered is delivered to the target goods collection container through the delivery mechanism. The target goods collection container is any goods collection container in the target goods collection container cluster, the goods collection container cluster includes a plurality of goods collection container groups, one goods collection container group includes at least one target goods collection container, and the plurality of collection container groups are distributed in the site in an array. The transverse channels and the longitudinal channels formed by the array gaps are the moving channels of the robots, one target goods collection container corresponds to at least one route-and-direction, and the opening of the target goods collection container is the delivery port of the goods. Technical solutions provided in the embodiments of the present disclosure can improve the sorting efficiency of goods, reduce labor costs and simultaneously improve extending flexibility of the sorting system.

Embodiment Five

Figure 6:
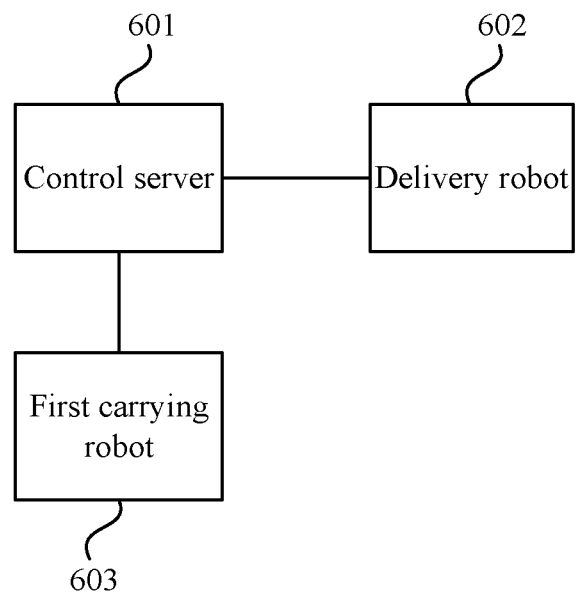
FIG. 6 is a structural diagram of a goods sorting system according to Embodiment five of the present disclosure.

FIG. 6 is a structural diagram of a goods sorting system according to Embodiment five of the present disclosure, and the embodiment may be applicable to the case of goods sorting. The goods sorting system includes a control server 601, a plurality of delivery robots 602 and a plurality of first carrying robots 603, where the control server is communicatively connected to the plurality of delivery robots and the plurality of first carrying robots, respectively. In the embodiment, the control server 601 establishes a communication connection to the plurality of delivery robots 602 and the plurality of first carrying robots 603, respectively, and is configured to implement control and scheduling of the entire goods sorting system. In an embodiment, the control server 601 is a software system having data storage and information processing capabilities, and may be connected to the delivery robot 602, the first carrying robot 603 and other hardware input systems or software systems in the system in a wired or wireless manner. The control server 601 may issue a task to the delivery robot 602 and the first carrying robot 603, transmit information to workers, count a status of goods to be delivered in a target goods collection container, and issue a control command to the delivery robots 602 and the first carrying robots 603, and the like.

In an embodiment, the plurality of delivery robots 602 and the plurality of first carrying robots 603 all operate on the ground of the site, the target goods collection container is provided on the ground of the site, one target goods collection container corresponds to at least one route direction, and an opening of the target goods collection container is a delivery port.

The control server 601 is configured to determine the delivery port according to a route-and-direction of the goods to be delivered, allocate the delivery robot 602 to the goods to be delivered, plan a traveling rote for the delivery robot 602, generate a delivery instruction corresponding to the goods to be delivered, and send the delivery instruction to the delivery robot 602, where the delivery instruction includes the traveling rote of the delivery robot 602.

In the embodiment, a route-and-direction of the goods to be delivered may be understood as a receiving address of the goods to be delivered, where the receiving address refers to a plurality of goods to be delivered each having its own independent receiving address. The consignee address refers to the final destination address of the goods to be delivered. In an embodiment, the goods to be delivered are classified and sorted according to the receiving addresses of the goods to be delivered. In an embodiment, the number of delivery robots 602 may be one or more, and the number of delivery robots 602 allocated by the control server 601 for the goods to be delivered is at least one. The number of delivery robots 602 allocated by the control server 601 to the goods to be delivered is related to the number of goods to be delivered. In an embodiment, one delivery robot 602 delivers one goods to be delivered. In another embodiment, one delivery robot 602 delivers two goods to be delivered.

In an embodiment, the receiving addresses of the goods to be delivered correspond to different delivery ports. The control server 601 prestores a correspondence between the receiving addresses and the delivery ports. After the control server 601 acquires the receiving address of the goods to be delivered, a query is made in a database of the control server 601 according to the receiving address of the goods to be delivered, and the delivery port corresponding to the receiving address of the goods to be delivered is determined.

The delivery robot 602 is configured to, in response to the delivery instruction, move to the delivery port according to the traveling rote of the delivery robot 602, deliver the goods to be delivered to the delivery port and return to a first designated position.

In the embodiment, the target goods collection container is arranged at a position below the delivery port and lower than the delivery port, and the delivery port is bound to a target goods collection container with a specific receiving address, so as to receive the goods to be delivered corresponding to the specific receiving address. The first designated position refers to a position where the delivery robot 602 stops after delivery of the delivery robot 602 is completed. In an embodiment, a goods supply platform in the site is used as the first designated position, that is, the delivery robot 602 waits near the goods supply platform until the control server allocates the task again.

The target goods collection container may be a common container for storing goods to be delivered, such as a common cage trolley, a package bag, or the like. The target goods collection container is typically set to carry items with common properties. In an embodiment, the target goods collection container may carry goods to be delivered having a specific receiving address, exemplarily, the target goods collection container may carry goods to be delivered sent to Haidian District, Beijing.

The control server 601 is further configured to: when the number of goods collected in a target goods collection container below the delivery port is greater than or equal to a preset threshold, allocate the first carrying robot 603 to the target goods collection container, plan a traveling rote for the first carrying robot 603, generate a carrying instruction corresponding to the target goods collection container, and send the carrying instruction to the first carrying robot 603, where the carrying instruction includes the traveling rote of the first carrying robot 603.

In an embodiment, the number of first carrying robots 603 allocated by the control server 601 is one or more. The number of first carrying robots 603 allocated by the control server 601 is related to the number of target goods collection containers to be carried. In an embodiment, one first carrying robot carries one target goods collection container.

In the embodiment, in order to enable the control server to count the number of goods to be delivered collected in a goods container within preset time, the delivery port is provided with a detection apparatus that can detect the number of goods to be delivered falling into the target goods collection container.

Another implementation mode is further provided in the embodiment, in order to enable the control server 601 to count the number of goods to be delivered collected in the target goods collection container within the preset time, the control server 601 performs accumulation according to the receiving address corresponding to the target goods collection container for the delivery instructions completed by the delivery robot 602.

Another implementation mode is further provided in the embodiment, and whether the goods to be delivered in the target goods collection container meet the preset capacity within the preset time is counted. In this implementation mode, the detection apparatus arranged at the delivery port is a depth detection apparatus, whether a plane of the goods to be delivered in the target goods collection container meets a preset condition is detected, and then whether the target goods collection container is full is determined.

In the embodiment, when the number of goods to be delivered collected in one of the target goods collection containers is greater than the preset threshold, the control server 601 acquires the position of the target goods collection container, acquires a goods collection station corresponding to the goods container, allocates a first carrying robot 603 to the target goods collection container, plans a traveling rote for the first carrying robot 603, generates the carrying instruction corresponding to the target goods collection container, and sends the carrying instruction to the first carrying robot 603.

The first carrying robot 603 is configured to, in response to the carrying instruction, move to the target goods collection container according to the traveling rote of the first carrying robot 603, carry the target goods collection container to the goods collection station and return to a second designated position.

In the embodiment, the first carrying robot 603 may have an intelligent system, be able to communicate with the control server 601, and receive the carrying instruction sent by the control server 601. In an embodiment, the carrying instruction includes at least a position of the goods container, a carrying address and route navigation information. In response to carrying instructions corresponding to one or more delivery ports, the first carrying robot 603 carries one or more goods to be delivered in the target goods collection container from the position of the target goods collection container to the goods collection station corresponding to the target goods collection container according to the route navigation information.

The second designated position refers to a position where the carrying robot stops after the carrying by the carrying robot is completed. In an embodiment, the region near the goods collection station in the site is used as the second designated position, that is, the carrying robot waits near the goods supply platform until the control server allocates the task again.

A goods sorting system is provided in the embodiments of the present disclosure. The control server determines the delivery port according to the receiving address of the goods to be delivered, assigns the delivery robot to the goods to be delivered, plans the traveling rote for the delivery robot, generates the delivery instruction corresponding to the goods to be delivered, and sends the delivery instruction to the delivery robot, where the delivery instruction includes the traveling rote of the delivery robot. In response to the delivery instruction, the delivery robot moves to the delivery port according to the traveling rote, delivers the goods to be delivered to delivery port and returns to the first designated position. When the number of goods collected in the target goods collection container below the delivery port is greater than or equal to the preset threshold, the control server allocates the first carrying robot to the target goods collection container, plans the traveling rote for the first carrying robot, generates the carrying instruction corresponding to the target goods collection container, and sends the carrying instruction to the first carrying robot, where the carrying instruction includes the traveling rote of the first carrying robot. In response to the carrying instruction, the first carrying robot moves to the target goods collection container according to the traveling rote, carries the target goods collection container to the goods collection station and returns to the second designated position. That is, in technical solutions provided in the embodiments of the present disclosure, when the number of goods to be delivered collected in one or more target goods collection containers is greater than the preset threshold, the carrying robot may carry one or more goods to be delivered in each target goods collection container to the goods collection station according to the carrying instruction sent by the control server, and therefore, the method of collecting the goods to be delivered in a manual manner is avoided, so that the efficiency of goods sorting can be improved, and the accuracy of goods sorting can also be improved.

Embodiment Six

Figure 7:
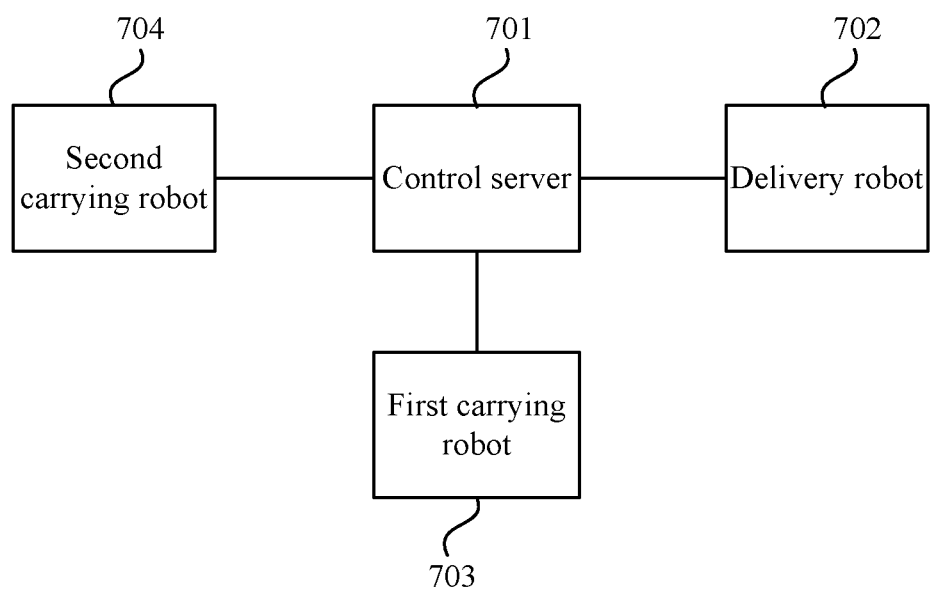
FIG. 7 is a structural diagram of a goods sorting system according to Embodiment six of the present disclosure.

In the embodiment, a goods sorting system is optimized on the basis of the above embodiment. FIG. 7 is a structural diagram of a goods sorting system according to Embodiment six of the present disclosure. As shown in FIG. 7, the goods sorting system includes a control server 701, a plurality of delivery robots 702, a plurality of first carrying robots 703 and a plurality of second carrying robots 704. The plurality of second carrying robots all operate on a ground of a site.

The control server 701 is configured to determine a delivery port according to a route-and-direction of a goods to be delivered, allocate a delivery robot 702 to the goods to be delivered, plan a traveling rote for the delivery robot 702, generate a delivery instruction corresponding to the goods to be delivered, and send the delivery instruction to the delivery robot 702, where the delivery instruction includes the traveling rote of the delivery robot 702.

In the embodiment, the route-and-directions (that is, receiving addresses) of the goods to be delivered correspond to different delivery ports. The control server 701 prestores a correspondence between the receiving addresses and the delivery ports. After the control server 701 acquires the receiving address of the goods to be delivered, a query is made in a database of the control server 701 according to the receiving address of the goods to be delivered, and the delivery port corresponding to the receiving address of the goods to be delivered is determined.

The delivery robot 702 is configured to, in response to the delivery instruction, move to the delivery port according to the traveling rote of the delivery robot 702, deliver the goods to be delivered to the delivery port and return to a first designated position.

In the embodiment, a target goods collection container is arranged at a position below the delivery port and lower than the delivery port, and the delivery port is bound to the target goods collection container with a specific receiving address, so as to receive the goods to be delivered with the specific receiving address. The first designated position refers to a position where the delivery robot 702 stops after the delivery robot 702 completes the delivery. In an embodiment, a goods supply platform in the site is used as the first designated position, that is, the delivery robot 702 waits near the goods supply platform until the control server allocates a task again.

The control server 701 is further configured to: when the number of collected goods in the target goods collection container below the delivery port is greater than or equal to a preset threshold, allocate the first carrying robot 703 to the target goods collection container, plan a traveling rote for the first carrying robot 703, generate a carrying instruction corresponding to the target goods collection container, and send the carrying instruction to the first carrying robot 703, where the carrying instruction includes the traveling rote of the first carrying robot 703.

In the embodiment, in order to enable the control server to count the number of goods to be delivered collected in a goods container within preset time, a detection apparatus is provided at the delivery port and can detect the number of goods to be delivered falling into the target goods collection container.

The first carrying robot 703 is configured to, in response to the carrying instruction, move to the target goods collection container according to the traveling rote of the first carrying robot 703, carry the target goods collection container to the goods collection station and return to a second designated position.

In the embodiment, the first carrying robot 703 may have an intelligent system, be able to communicate with the control server 701, and receive the carrying instruction sent by the control server 701. In an embodiment, the carrying instruction includes at least a position of the goods container, a carrying address and route navigation information. In response to carrying instructions corresponding to one or more delivery ports, the first carrying robot 703 carries one or more goods to be delivered in the target goods collection container from the position of the target goods collection container to the goods collection station corresponding to the target goods collection container according to the route navigation information.

The control server 701 is further configured to allocate the second carrying robot 704 to an empty goods collection container, plan a traveling rote for the second carrying robot 704, generate a carrying instruction corresponding to the empty goods collection container, and send the carrying instruction to the second carrying robot 704, where the carrying instruction includes the traveling rote of the second carrying robot 704.

In the embodiment, after the first carrying robot 703 transports away the target goods collection container filled with goods, in order to avoid the goods to be delivered from falling on the ground, the control server simultaneously allocates one second carrying robot 704 to transports one empty goods collection container to the corresponding delivery port. The second carrying robot 704 is allocated to the empty goods collection container, a traveling rote is planned for the second carrying robot 704 according to the current position of the empty goods collection container and a position of the delivery port, a carrying instruction corresponding to the empty goods collection container is generated, and the carrying instruction is sent to the second carrying robot 704, where the carrying instruction includes the traveling rote of the second carrying robot 704.

In an embodiment, the number of second carrying robots 704 allocated by the control server 701 is one or more. The number of second carrying robots 704 allocated by the control server 701 is related to the number of target goods collection containers to be transported. In an embodiment, one second carrying robot 704 carries one target goods collection container.

The second carrying robot 704 is configured to, in response to the carrying instruction corresponding to the empty goods collection container, carry the empty goods collection container to the target goods collection container according to the traveling rote of the second carrying robot 704, and then return to the second designated position.

In the embodiment, the first carrying robot 703 and the second carrying robot 704 are of the same type, and the first carrying robot 703 and the second carrying robot 704 are divided according to different tasks performed by the first carrying robot and the second carrying robot. The first carrying robot 703 is configured to transport a target goods collection container filled with goods, and the second carrying robot 704 is configured to transport the empty goods collection container. According to different carrying instructions, the first carrying robot 703 may be used as the second carrying robot 704, and similarly, the second carrying robot 704 may be used as the first carrying robot 703.

The second designated position refers to a position where the carrying robot stops after the carrying robot completes the transport. In an embodiment, the region near the goods collection station in the site is used as the second designated position, that is, the carrying robot waits near the goods supply platform for the task allocated by the control server again.

In an embodiment, the delivery robot 702, the first carrying robot 703 and the second carrying robot 704 all operate on the ground of the site; the delivery port is bound to the target goods collection container through a binding instruction of the controller, and at least one target goods collection container is provided on the ground.

In an embodiment, in order to place more goods containers within limited positions, two goods containers or three goods containers may be placed side by side to form a goods container group. The number of goods container groups may be reasonably designed according to the area of the site.

A goods sorting system is provided in the embodiments of the present disclosure. The control server determines the delivery port according to the receiving address of the goods to be delivered, allocates the delivery robot to the goods to be delivered, plans the traveling rote for the delivery robot, generates the delivery instruction corresponding to the goods to be delivered, and sends the delivery instruction to the delivery robot, where the delivery instruction includes the traveling rote of the delivery robot. In response to the delivery instruction, the delivery robot moves to the delivery port according to the traveling rote, delivers the goods to be delivered to the delivery port and returns to the first designated position. When the number of collected goods in the target goods collection container below the delivery port is greater than or equal to the preset threshold, the control server allocates the first carrying robot to the target goods collection container, plans the traveling rote for the first carrying robot, generates the carrying instruction corresponding to the target goods collection container, and sends the carrying instruction to the first carrying robot, where the carrying instruction includes the traveling rote of the first carrying robot. In response to the carrying instruction, the first carrying robot moves to the target goods collection container according to the traveling rote, carries the target goods collection container to the goods collection station and returns to the second designated position. That is, in technical solutions provided in the embodiments of the present disclosure, when the number of goods to be delivered collected in one or more target goods collection containers is greater than the preset threshold, the carrying robot carries one or more goods to be delivered in the target goods collection container to the goods collection station according to the carrying instruction sent by the control server, and therefore, the method of collecting the goods to be delivered in a manual manner is avoided, so that the efficiency of goods sorting can be improved, and the accuracy of goods sorting can also be improved.

Embodiment Seven

Figure 8:
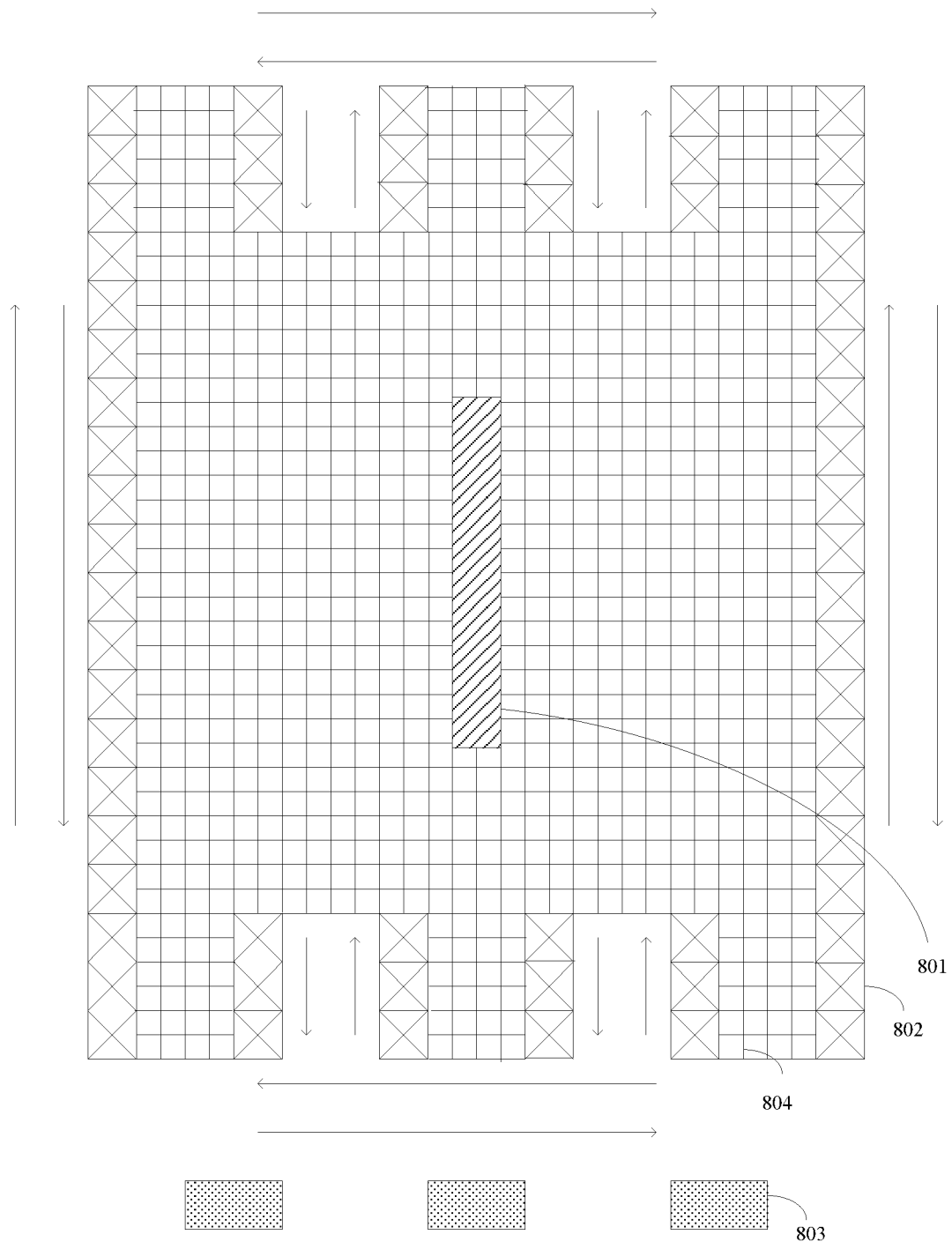
FIG. 8 is a layout diagram of a sorting system according to Embodiment seven of the present disclosure.

In the embodiment, a goods sorting system is optimized on the basis of the above embodiment. FIG. 8 is a layout diagram of a sorting system according to Embodiment seven of the present disclosure. As shown in FIG. 8, a plurality of target goods collection containers are arranged as a polygon outline in a site, a goods supply platform 801 is located inside the polygon outline, a goods collection station 803 is located outside the polygon outline, a region inside the polygon outline forms walking channels of a delivery robot, and a region outside the polygon outline forms moving channels for first carrying robots and second carrying robots. The polygon outline is a rectangular outline and is partially provided with an opening.

The goods supply platform 801 is provided in the center of the site. Target goods collection containers 802 are provided around the site or on one or more sides around the site. The goods collection station 803 is provided outside the target goods collection containers 802. The goods collection station 803 is a place where a goods container is collected, that is, the carrying robot carries the goods container from a position of the target goods collection container 802 to the goods collection station 803 for subsequent processing by workers. A small check 804 is a representation method of meshing a map. The goods supply platform 801 includes at least a shelf for storing goods to be delivered and a working position of the workers.

Figure 9:
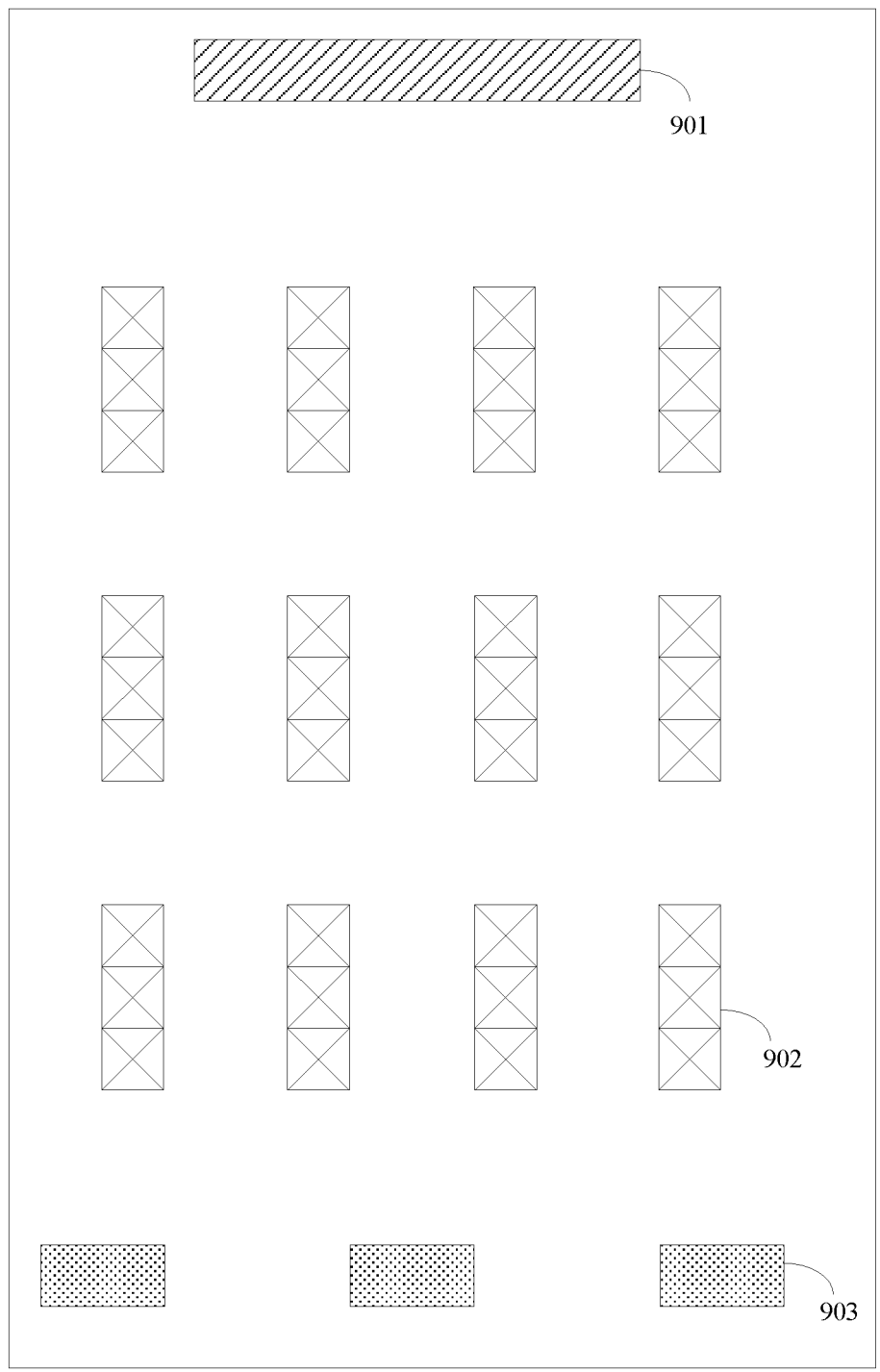
FIG. 9 is a layout diagram of a sorting system according to Embodiment seven of the present disclosure.

FIG. 9 is a layout diagram of a sorting system according to Embodiment seven of the present disclosure. As shown in FIG. 4, at least one target goods collection container 902 is placed to form a goods collection container group, at least one target goods collection container group is arranged in an array in the site, and transverse channels and longitudinal channels among different goods collection container groups in the array form moving channels of the delivery robots and moving channels of the first carrying robots and the second carrying robots. The goods supply platform 901 and the goods collection station 903 are located on two sides of the goods collection container array, respectively.

A supply end 901 is provided on a side of the site, and the goods collection container groups are provided in a center of the site, where three target goods collection containers 902 form one goods collection container group. The goods collection station 903 is provided on a side opposite to the goods supply platform 901. The goods collection station 903 is a place where the target goods container is collected, that is, the carrying robot carries the target goods collection container 902 from a position of the target goods collection container 902 to the goods collection station 903 for subsequent processing by the workers. The layout diagram of the sorting system is represented by meshing the map, and the meshed small cells are not shown in the figure. The goods supply platform 901 includes at least the shelf for storing goods to be delivered and the working position of the workers.

The map is meshed in the two layout solutions, and when the delivery robot occupies a minimum cell, the delivery port and the carrying robot corresponding to the goods container occupy four cells. Each goods container corresponds to a receiving address of the goods to be delivered. In FIGS. 8 and 9, three goods collection containers form a goods container group, and moving channels of the delivery robot and the carrying robot are reserved among the goods containers. With such layout solution, positions of the delivery port and the goods container may be arranged as many as possible within a very small area.

In the layout solution of the sorting system shown in FIG. 8, directions indicated by arrows indicate the moving channels of the carrying robot, and cells in the middle are the moving channel of the delivery robot. In the layout solution of the sorting system shown in FIG. 9, the carrying robot and the delivery robot move in the moving channels among cage trolleys, and share the same moving channels.

In an embodiment, the delivery robot is provided with a supply device (which may also be understood as a delivery mechanism), where a height of the supply device from the ground is greater than a height of the delivery port from the ground, and the supply device is provided with a roller or a belt, where the roller or the belt is configured to deliver the carried goods to be delivered to the target goods collection container by wheeling. The delivery robot performs delivery on two sides using the belt. When the delivery robot rotates locally, the belt keeps a constant angle, which can reduce occupied space during the rotation.

An embodiment of goods sorting is provided in the embodiments of the present disclosure. Firstly, the control server generates a delivery instruction corresponding to each goods to be delivered according to the receiving addresses of one or more goods to be delivered, and sends the delivery instruction corresponding to each goods to be delivered to the delivery robot. In response to the delivery instruction corresponding to the goods to be delivered, the delivery robot delivers each goods to be delivered to a goods container corresponding to the each goods to be delivered. Secondly, when the number of goods to be delivered collected in one or more goods containers is greater than a preset threshold, the control server generates a carrying instruction corresponding to each goods container according to a carrying address corresponding to each goods container. Finally, in response to carrying instructions corresponding to one or more goods containers, the carrying robot carries one or more goods to be delivered in each goods container to a corresponding carrying address. That is, in technical solutions provided in the embodiments of the present disclosure, when the number of goods to be delivered collected in one or more goods containers is greater than the preset threshold, the carrying robot may carry one or more goods to be delivered in each goods container to a designated position according to the carrying instruction sent by the control server, and therefore, the method for collecting the goods to be delivered in a manual manner is avoided, so that the efficiency of goods sorting can be improved, and the accuracy of goods sorting can also be improved.

Embodiment Eight

Figure 10:
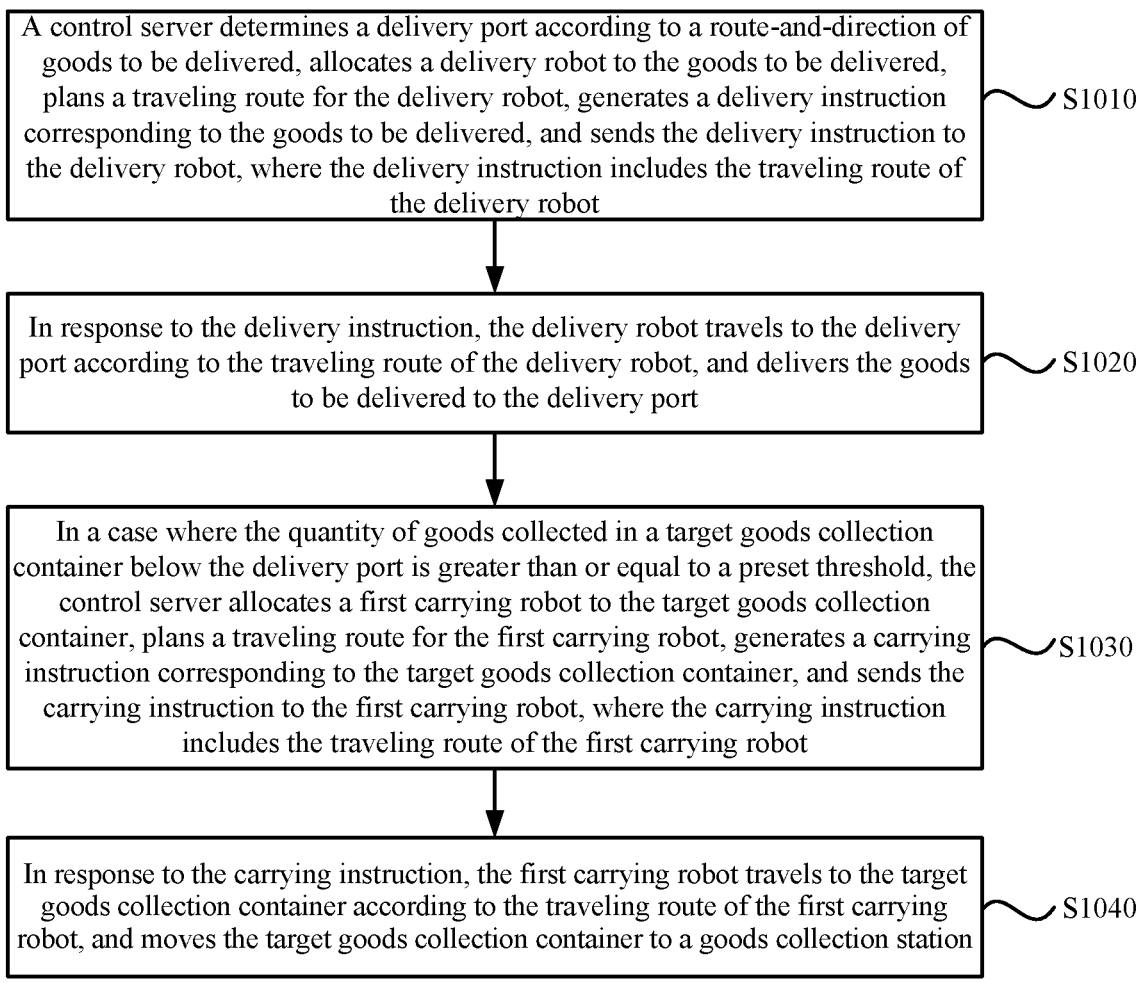
FIG. 10 is a flowchart of a goods sorting method according to Embodiment eight of the present disclosure.

FIG. 10 is a flowchart of a goods sorting method according to Embodiment eight of the present disclosure, and the embodiment may be applicable to the case of goods sorting. The method includes steps S1010 to S1040.

In step S1010, a control server determines a delivery port according to a route-and-direction of a goods to be delivered, allocates a delivery robot to the goods to be delivered, plans a traveling rote for the delivery robot, generates a delivery instruction corresponding to the goods to be delivered, and sends the delivery instruction to the delivery robot, where the delivery instruction includes the traveling rote of the delivery robot.

In the embodiment, receiving addresses of the goods to be delivered correspond to different delivery ports. The control server pre-stores a correspondence between the receiving addresses and the delivery ports. After the control server acquires the receiving address of the goods to be delivered, a query is made in a database of the control server according to the receiving address of the goods to be delivered, and the delivery port corresponding to the receiving address of the goods to be delivered is determined.

In step S1020, in response to the delivery instruction, the delivery robot moves to the delivery port according to the traveling rote of the delivery robot, and delivers the goods to be delivered to the delivery port.

The delivery robot delivers the goods to be delivered to the delivery port and returns to a first designated position. The delivery robot operates on the ground of a site.

In the embodiment, a target goods collection container is arranged at a position below the delivery port and lower than the delivery port, and the delivery port is bound to a target goods collection container with a specific receiving address, so as to receive the goods to be delivered with the specific receiving address. The first designated position refers to a position where the delivery robot stops after the delivery robot completes the delivery. In an embodiment, a goods supply platform in the site is used as the first designated position, that is, a robot waits near the goods supply platform for the control server allocating a task again.

In step S1030, in a case where the number of collected goods in a target goods collection container below the delivery port is greater than or equal to a preset threshold, the control server allocates the first carrying robot to the target goods collection container, plans a traveling rote for the first carrying robot, generates a carrying instruction corresponding to the target goods collection container, and sends the carrying instruction to the first carrying robot, where the carrying instruction includes the traveling rote of the first carrying robot.

The target goods collection container is provided on the ground of the site, one target goods collection container corresponds to at least one route direction, and an opening of the target goods collection container is the delivery port.

In the embodiment, in order to enable the control server to count the number of goods to be delivered collected in a goods container within preset time, a detection apparatus is provided at the delivery port and can detect the number of goods to be delivered falling into the target goods collection container.

In step S1040, in response to the carrying instruction, the first carrying robot moves to the target goods collection container according to the traveling rote of the first carrying robot, and carries the target goods collection container to a goods collection station.

The first carrying robot carries the target goods collection container to the goods collection station and then returns to a second designated position. The first carrying robot operates on the ground of the site.

In the embodiment, the first carrying robot may have an intelligent system, be able to communicate with the control server, and receive the carrying instruction sent by the control server. In an embodiment, the carrying instruction includes at least a position of the goods container, a carrying address and route navigation information. In response to carrying instructions corresponding to one or more delivery ports, the first carrying robot carries one or more goods to be delivered in the target goods collection container from the position of the target goods collection container to the goods collection station corresponding to the target goods collection container according to the route navigation information.

In an embodiment, the goods sorting method further includes steps described below. The control server allocates a second carrying robot to an empty goods collection container, plans a traveling rote for the second carrying robot, generates a carrying instruction corresponding to the empty goods collection container, and sends the carrying instruction to the second carrying robot, where the carrying instruction includes the traveling rote of the second carrying robot.

In response to the carrying instruction corresponding to the empty goods collection container, the second carrying robot carries the empty goods collection container to the target goods collection container according to the traveling rote of the second carrying robot and returns to the second designated position.

In an embodiment, the delivery robot, the first carrying robot and the second carrying robot all operate on the ground of the site; the delivery port is bound to the target goods collection container through a binding instruction of a controller, and at least one target goods collection container is provided on the ground.

In an embodiment, at least one target goods collection container is placed to form a goods collection container group, at least one target goods collection container group is arranged in an array in the site, and transverse channels and longitudinal channels among different goods container groups in the array form moving channels of the delivery robots and moving channels of the first carrying robots and the second carrying robots. In an embodiment, a goods supply platform and a goods collection station are located on two sides of the goods collection container array, respectively.

In an embodiment, the goods containers are arranged as a polygon outline in the site, a goods supply platform is located inside the polygon outline, a goods collection station is located outside the polygon outline, a region inside the polygon outline forms moving channels for delivery robots, and a region outside the polygon outline forms moving channels for first carrying robots and second carrying robots. The polygon outline is a rectangular outline and the polygon outline is partially provided with an opening.

In an embodiment, the step in which the delivery robot delivers the goods to be delivered to the delivery port includes: using a roller or a belt to deliver the goods to be delivered carried by the roller or the belt to the target goods collection container through the delivery port by wheeling.

The delivery robot is provided with a supply device, a height of the supply device from the ground is greater than a height of the delivery port from the ground, and the supply device is provided with the roller or the belt.

A goods sorting method is provided in the embodiments of the present disclosure. Firstly, the control server generates a delivery instruction corresponding to each goods to be delivered according to the receiving addresses of one or more goods to be delivered, and sends the delivery instruction corresponding to each goods to be delivered to the delivery robot. In response to the delivery instruction corresponding to the goods to be delivered, the delivery robot delivers each goods to be delivered to a goods container corresponding to each goods to be delivered. Secondly, when the number of goods to be delivered collected in one or more goods containers is greater than the preset threshold, the control server generates a carrying instruction corresponding to each goods container according to a carrying address corresponding to each goods container. Finally, in response to carrying instructions corresponding to one or more goods containers, the carrying robot carries one or more goods to be delivered in each goods container to a corresponding carrying address. That is, in technical solutions provided in the embodiments of the present disclosure, when the number of goods to be delivered collected in one or more goods containers is greater than the preset threshold, the carrying robot carries one or more goods to be delivered in each goods container to a designated position according to the carrying instruction sent by the control server, and therefore, the method of collecting the goods to be delivered in a manual manner is avoided, so that the efficiency of goods sorting can be improved, and the accuracy of goods sorting can also be improved.

Embodiment Nine

Figure 11:
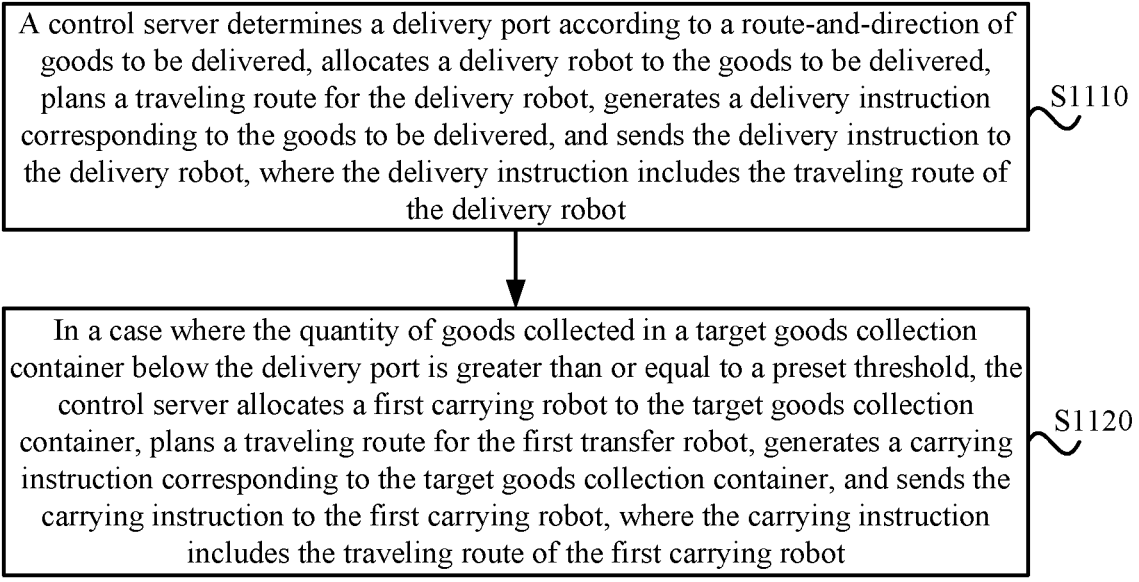
FIG. 11 is a flowchart of a goods sorting method according to Embodiment nine of the present disclosure.

FIG. 11 is a flowchart of a goods sorting method according to Embodiment nine of the present disclosure, and the embodiment may be applicable to the case of goods sorting. The method includes steps S1110 to S1120.

In step S1110, a control server determines a delivery port according to a route-and-direction of a goods to be delivered, allocates a delivery robot to the goods to be delivered, plans a traveling rote for the delivery robot, generates a delivery instruction corresponding to the goods to be delivered, and sends the delivery instruction to the delivery robot, where the delivery instruction includes the traveling rote of the delivery robot.

In step S1120, in a case where the number of collected goods in a target goods collection container below the delivery port is greater than or equal to a preset threshold, the control server allocates a first carrying robot to the target goods collection container, plans a traveling rote for the first carrying robot, generates a carrying instruction corresponding to the target goods collection container, and sends the carrying instruction to the first carrying robot, where the carrying instruction includes the traveling rote of the first carrying robot.

The delivery robot and the first carrying robot both operate on the ground of a site, the target goods collection container is provided on the ground of the site, one target goods collection container corresponds to at least one route-and-direction, and an opening of the target goods collection container is the delivery port.

In an embodiment, the method further includes a step described below.

The control server allocates a second carrying robot to an empty goods collection container, plans a traveling rote for the second carrying robot, generates a carrying instruction corresponding to the empty goods collection container, and sends the carrying instruction to the second carrying robot, where the carrying instruction comprises the traveling rote of the second carrying robot.

The second carrying robot operates on the ground of the site.

The embodiment has the same concept as the above-described embodiments, and what has been described in the embodiments described above will not be repeated herein.

Embodiment Ten

Figure 12:
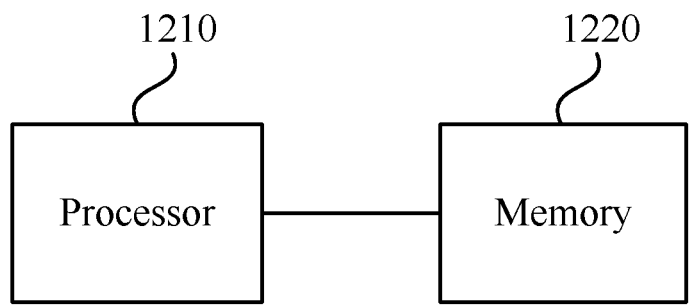
FIG. 12 is a structural diagram of a server according to Embodiment ten of the present disclosure.

FIG. 12 is a structural diagram of a server according to Embodiment ten of the present disclosure. A server is provided in the embodiments of the present disclosure and includes one or more processors 1210 and a memory 1220.

The memory 1220 is configured to store one or more programs.

When executed by the one or more processors 1210, the one or more processors 1210 implement the method executed on a server side described above.

The embodiments of the present disclosure further provide a computer-readable storage medium configured to store computer programs for implementing the method executed on a server side described above when the computer programs are executed by a processor.

The storage medium is any one or more types of memory devices or storage devices. In a practical application, the storage medium described above may be a volatile memory such as a random-access memory (RAM), may be a non-volatile memory such as a read-only memory (ROM), a flash memory, a hard disk drive (HDD) or a solid-state drive (SSD), or may be a combination thereof, and the storage medium described above provides instructions and data for the processor.

The storage medium described above may further include a compact disc read-only memory (CD-ROM), a floppy disk or a magnetic tape apparatus; a computer system memory or a random access memory such as a dynamic random access memory (DRAM), a double data rate random access memory (DDR RAM), a static random-access memory (SRAM), an extended data output random access memory (EDO RAM), or a Rambus random access memory (Rambus RAM); the non-volatile memory such as a flash memory or a magnetic medium (such as the hard disk drive or optical storage; a register or other similar types of memory elements, etc. The storage medium may also include other types of memory or combinations thereof.

The processor described above may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor.

What is claimed is:

1. A goods sorting system, comprising: a control server, a plurality of delivery robots and a plurality of first carrying robots, wherein the control server is communicatively connected to the plurality of delivery robots and the plurality of first carrying robots, respectively; wherein the plurality of delivery robots and the plurality of first carrying robots all operate on a ground of a site;
wherein the control server is configured to determine a delivery port according to a route-and-direction of goods to be delivered, allocate one of the plurality of delivery robots to the goods to be delivered, plan a traveling route for the one of the plurality of delivery robots, generate a delivery instruction corresponding to the goods to be delivered, and send the delivery instruction to the one of the plurality of delivering robots, wherein the delivery instruction comprises the traveling route of the one of the plurality of delivery robots;
wherein the one of the plurality of delivery robots is configured to, in response to the delivery instruction, travel to the delivery port according to the traveling route of the one of the plurality of delivery robots, and deliver the goods to be delivered to the delivery port;
wherein the control server is further configured to, in a case where a number of goods collected in a target goods collection container below the delivery port is greater than or equal to a preset threshold, allocate one of the plurality of first carrying robots to the target goods collection container, plan a traveling route for the one of the plurality of first carrying robots, generate a carrying instruction corresponding to the target goods collection container, and send the carrying instruction to the one of the plurality of first carrying robots, wherein the carrying instruction comprises the traveling route of the one of the plurality of first carrying robots, the target goods collection container is provided on the ground of the site, one target goods collection container corresponds to at least one route-and-direction, and an opening of the target goods collection container is the delivery port; and
wherein the one of the plurality of first carrying robots is configured to, in response to the carrying instruction, travel to the target goods collection container according to the traveling route of the one of the plurality of first carrying robots, and carry the target goods collection container to a goods collection station.

2. The system of claim 1, further comprising: a plurality of second carrying robots;
wherein the control server is further configured to allocate one of the plurality of second carrying robots to an empty goods collection container, plan a traveling route for the one of the plurality of second carrying robots, generate a carrying instruction corresponding to the empty goods collection container, and send the carrying instruction to the one of the plurality of second carrying robots, wherein the carrying instruction comprises the traveling route of the one of the plurality of second carrying robots; and
wherein the one of the plurality of second carrying robots is configured to respond, in response to the carrying instruction corresponding to the empty goods collection container, and carry the empty goods collection container to the target goods collection container according to the traveling route of the one of the plurality of second carrying robots;
wherein the plurality of second carrying robots all operate on the ground of the site.

3. The system of claim 2, wherein at least one target goods collection container forms a goods collection container group, a plurality of goods collection container groups are arranged in an array in the site, and transverse channels and longitudinal channels among different goods collection container groups in the array are moving channels for robots,
wherein the system further comprises: a goods supply platform, wherein the goods supply platform and the goods collection station are located at two sides of the array, respectively.

4. The system of claim 2, wherein a plurality of target goods collection containers are arranged in the site and distributed along a polygon outline, a region inside the polygon outline forms moving channels of the plurality of delivery robots, and a region outside the polygon outline forms moving channels of the plurality of first carrying robots and the plurality of second carrying robots, wherein a part of the polygon outline has an opening shape, wherein the system further comprises a goods supply platform, wherein the goods supply platform is located inside the polygon outline, and the goods collection station is located outside the polygon outline.

5. The system of claim 3, wherein every two of the plurality of goods collection container groups are a pair, and a width of a channel between any two pairs of goods collection container groups is greater than a width of a channel between the two goods collection container groups within any one pair of goods collection container group, wherein the channel between the any two pairs of goods collection container groups is a traveling channel of the plurality of carrying robots, and the channel between the two goods collection container groups within the any pair of goods collection container groups is a moving channel of the plurality of delivery robots.

6. The system of claim 1, wherein the delivery robot comprises a delivery robot body and a delivery device provided on the delivery robot body; and wherein a height of the delivery device from the ground is greater than a height of the delivery port from the ground, the delivery device is provided with a roller, a belt or a turnover plate, wherein the roller, the belt or the turnover plate is configured to deliver goods to be delivered on the roller, the belt or the turnover plate into the target goods collection container by wheeling, wherein the one of the plurality of delivery robots is configured to, to response to the delivery instruction, travel to the target goods collection container according to a delivery route, and deliver the goods to be delivered to the target goods collection container through the delivery device.

7. The system of claim 1, wherein a delivery route planned by the control server for the one of the plurality of delivery robots is a ring-shaped route, and a turn of the ring-shaped route is arc-shaped.

8. The system of claim 1, wherein in a case where a total number of target goods collection containers is greater than a total number of route-and-directions, any one of the route-and-directions is bound to at least one of the target goods collection containers; and in a case where one of the route-and-directions is bound to at least two of the target goods collection containers, the at least two of the target goods collection containers belong to different goods collection container groups.

9. A goods sorting method, comprising:

a control server determining a delivery port according to a route-and-direction of goods to be delivered, allocating a delivery robot to the goods to be delivered, planning a traveling route for the delivery robot, generating a delivery instruction corresponding to the goods to be delivered, and sending the delivery instruction to the delivery robot, wherein the delivery instruction comprises the traveling route of the delivery robot;

in response to the delivery instruction, the delivery robot traveling to the delivery port according to the traveling route of the delivery robot, and delivering the goods to be delivered to the delivery port, wherein the delivery robot operates on a ground of a site;

in a case where a number of collected goods in a target goods collection container below the delivery port is greater than or equal to a preset threshold, assigning, by the control server allocating a first carrying robot to the target goods collection container, planning a traveling route for the first carrying robot, generating a carrying instruction corresponding to the target goods collection container, and sending the carrying instruction to the first carrying robot, wherein the carrying instruction comprises the traveling route of the first carrying robot, the target goods collection container is provided on the ground of the site, one target goods collection container corresponds to at least one route-and-direction, and an opening of the target goods collection container is the delivery port; and in response to the carrying instruction, the first carrying robot traveling to the target goods collection container according to the traveling route of the first carrying robot, and carrying the target goods collection container to a goods collection station, wherein the first carrying robot operates on the ground of the site.

10. The method of claim 9, further comprising:

the control server allocating a second carrying robot to an empty goods collection container, planning a traveling route for the second carrying robot, generating a carrying instruction corresponding to the empty goods collection container, and sending the carrying instruction to the second carrying robot, wherein the carrying instruction comprises the traveling route of the second carrying robot; and in response to the carrying instruction corresponding to the empty goods collection container, carrying, by the second carrying robot, the empty goods collection container to the target goods collection container according to the traveling route of the second carrying robot;

wherein the second carrying robot operates on the ground of the site.

11. The method of claim 10, wherein at least one target goods collection containers forms a goods collection container group, a plurality of goods collection container groups are arranged in an array in the site, and transverse channels and longitudinal channels among different goods collection container groups in the array form moving channels for robots, wherein in a case where a system further comprises a goods supply platform, the goods supply platform and the goods collection station are located at two sides of the array, respectively.

12. The method of claim 10, wherein a plurality of target goods collection containers are arranged in the site a and distributed along a polygon outline, a region inside the polygon outline forms walking channels of a plurality of delivery robots, and a region outside the polygon outline forms walking channels of a plurality of first carrying robots and a plurality of second carrying robots, wherein a part of the polygon outline has an opening shape, wherein in a case where a system further comprises a goods supply platform, the goods supply platform is located inside the polygon outline, and the goods collection station is located outside the polygon outline.

13. The method of claim 9, wherein the delivery robot delivering the goods to be delivered to the delivery port comprises: delivering, by using a roller, a belt or a turnover plate, the goods to be delivered carried by the roller, the belt or the turnover plate to the target goods collection container through the delivery port by wheeling;

wherein the delivery robot is provided with a delivery device, a height of the delivery device from the ground is greater than a height of the delivery port from the ground, and the delivery device is provided with the roller, the belt or the turnover plate, wherein in response to the delivery instruction, the delivery robot traveling to the delivery port according to the traveling route of the delivery robot, and delivering the goods to be delivered to the delivery port comprises:

in response to the delivery instruction, the delivery robot traveling to the target goods collection container according to a delivery route, and delivering the goods to be delivered to the target goods collection container through the delivery device.

14. A server, comprising:

one or more processors; and a memory configured to store one or more programs:

wherein when the one or more programs are executed by the one or more processors, the one or more processors are configured to:

determine, by a control server, a delivery port according to a route-and-direction of goods to be delivered;

allocate a delivery robot to the goods to be delivered;

plan a traveling route for the delivery robot;

generate a delivery instruction corresponding to the goods to be delivered;

send the delivery instruction to the delivery robot, wherein the delivery instruction comprises the traveling route of the delivery robot;

travel, by the delivery robot in response to the delivery instruction, to the delivery port according to the traveling route of the delivery robot;

deliver, by the delivery robot, the goods to be delivered to the delivery port, wherein the delivery robot operates on a ground of a site; and in a case where a number of collected goods in a target goods collection container below the delivery port is greater than or equal to a preset threshold:

assign, by the control server allocating a first carrying robot to the target goods collection container, planning a traveling route for the first carrying robot, generate a carrying instruction corresponding to the target goods collection container, and send the carrying instruction to the first carrying robot, wherein the carrying instruction comprises the traveling route of the first carrying robot, the target goods collection container is provided on the ground of the site, one target goods collection container corresponds to at least one route-and-direction, and an opening of the target goods collection container is the delivery port; and in response to the carrying instruction, the first carrying robot traveling to the target goods collection container according to the traveling route of the first carrying robot, and carrying the target goods collection container to a goods collection station, wherein the first carrying robot operates on the ground of the site.

15. A computer-readable storage medium storing computer programs, wherein when executed by a processor, the computer programs cause the processor to:

determine, by a control server, a delivery port according to a route-and-direction of goods to be delivered;

allocate a delivery robot to the goods to be delivered;

plan a traveling route for the delivery robot;

generate a delivery instruction corresponding to the goods to be delivered;

send the delivery instruction to the delivery robot, wherein the delivery instruction comprises the traveling route of the delivery robot;

travel, by the delivery robot in response to the delivery instruction, to the delivery port according to the traveling route of the delivery robot;

deliver, by the delivery robot, the goods to be delivered to the delivery port, wherein the delivery robot operates on a ground of a site; and in a case where a number of collected goods in a target goods collection container below the delivery port is greater than or equal to a preset threshold:

assign, by the control server allocating a first carrying robot to the target goods collection container, planning a traveling route for the first carrying robot, generate a carrying instruction corresponding to the target goods collection container, and send the carrying instruction to the first carrying robot, wherein the carrying instruction comprises the traveling route of the first carrying robot, the target goods collection container is provided on the ground of the site, one target goods collection container corresponds to at least one route-and-direction, and an opening of the target goods collection container is the delivery port; and in response to the carrying instruction, the first carrying robot traveling to the target goods collection container according to the traveling route of the first carrying robot, and carrying the target goods collection container to a goods collection station, wherein the first carrying robot operates on the ground of the site.

* * * * *